(12) United States Patent
Kettelhut

(10) Patent No.: US 11,658,919 B2
(45) Date of Patent: May 23, 2023

(54) DEVICE AND METHOD FOR INTERACTIVE ENVIRONMENT PROCESSING AND COMMUNICATION

(71) Applicant: Karl M. Kettelhut, Las Vegas, NV (US)

(72) Inventor: Karl M. Kettelhut, Las Vegas, NV (US)

(73) Assignee: CYBORG PHOENIX SIMULATIONS LLC, Las Vegas, NV (US)

( * ) Notice: Subject to any disclaimer, the term of this patent is extended or adjusted under 35 U.S.C. 154(b) by 30 days.

(21) Appl. No.: 17/394,116

(22) Filed: Aug. 4, 2021

(65) Prior Publication Data

US 2023/0040196 A1 Feb. 9, 2023

(51) Int. Cl.
| | |
|---|---|
| *G06F 15/16* | (2006.01) |
| *H04L 47/70* | (2022.01) |
| *A63F 13/35* | (2014.01) |
| *H04L 67/1095* | (2022.01) |
| *H04L 67/52* | (2022.01) |

(52) U.S. Cl.
CPC ............. *H04L 47/82* (2013.01); *A63F 13/35* (2014.09); *H04L 67/1095* (2013.01); *H04L 67/52* (2022.05)

(58) Field of Classification Search
CPC ..... H04L 47/82; H04L 67/52; H04L 67/1095; A63F 13/35
USPC ........................................................ 709/226
See application file for complete search history.

(56) References Cited

U.S. PATENT DOCUMENTS

| | | | | |
|---|---|---|---|---|
| 9,325,795 | B2* | 4/2016 | Kim | G06F 16/95 |
| 9,737,803 | B2* | 8/2017 | Lee | A63F 13/332 |
| 9,802,121 | B2* | 10/2017 | Ackley | A63F 13/332 |
| 9,911,279 | B2* | 3/2018 | Mound | G07F 17/3262 |
| 9,922,494 | B2* | 3/2018 | Mound | G07F 17/3239 |
| 9,928,683 | B2* | 3/2018 | Mound | G07F 17/323 |
| 10,456,680 | B2* | 10/2019 | Miron | A63F 13/822 |
| 10,610,779 | B2* | 4/2020 | Hunter | A63F 13/79 |
| 10,913,004 | B1* | 2/2021 | Wu | A63F 13/48 |
| 11,369,887 | B2* | 6/2022 | Zeidman | H04N 21/4781 |
| 2011/0250872 | A1* | 10/2011 | Kim | H04L 67/34 |
| | | | | 455/414.1 |

(Continued)

*Primary Examiner* — Moustafa M Meky
(74) *Attorney, Agent, or Firm* — Bayramoglu Law Offices LLC

(57) ABSTRACT

A user device, for environmental processing and communication, the device comprising a multiple and preferably independent communication module; the multiple and preferably independent communication module configured to communicably coupling to one or more communication networks, wherein the one or more multiple and preferably independent communication modules couple the user device to one or more servers, one or more processing modules, a memory module comprising instructions stored therein, which, when executed by the one or more processing modules cause the one or more processing modules to perform operations comprising, receiving one or more messages from the one or more servers through the one or more communication networks, extracting an information from the one or more messages, storing the extracted information in the memory module for immediate execution by the one or more processing modules.

29 Claims, 12 Drawing Sheets
(11 of 12 Drawing Sheet(s) Filed in Color)

(56) References Cited

U.S. PATENT DOCUMENTS

2018/0361235 A1\* 12/2018 Hunter ................ H04L 67/5681
2021/0370187 A1\* 12/2021 Zeidman ................ A63F 13/35

\* cited by examiner

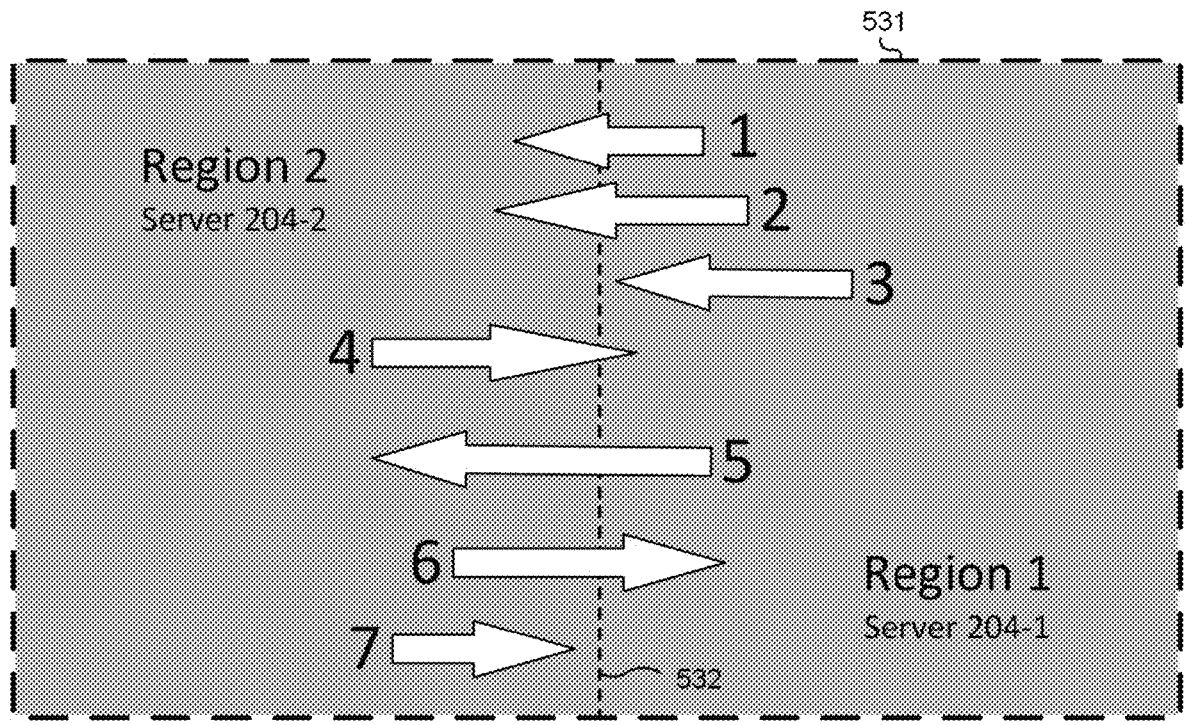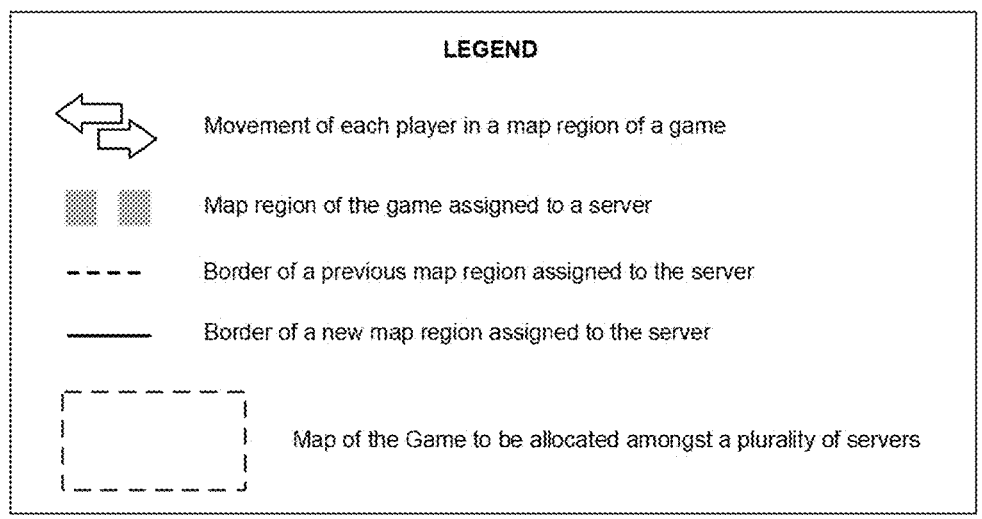
FIG. 5A

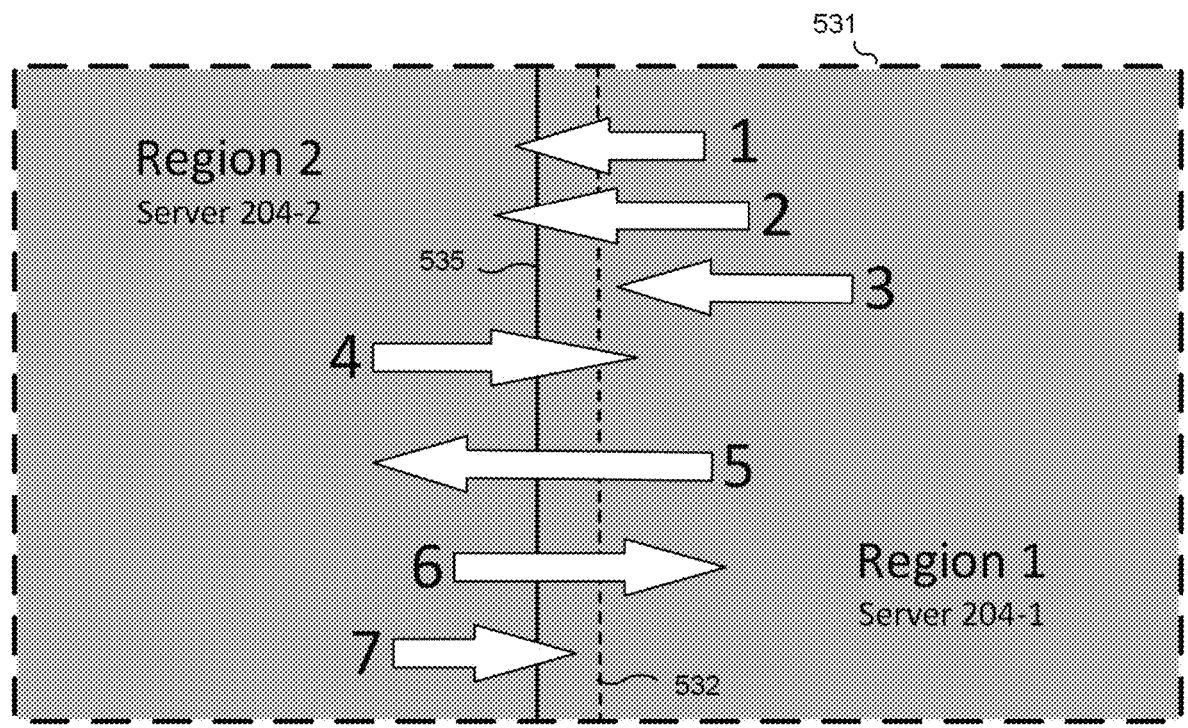
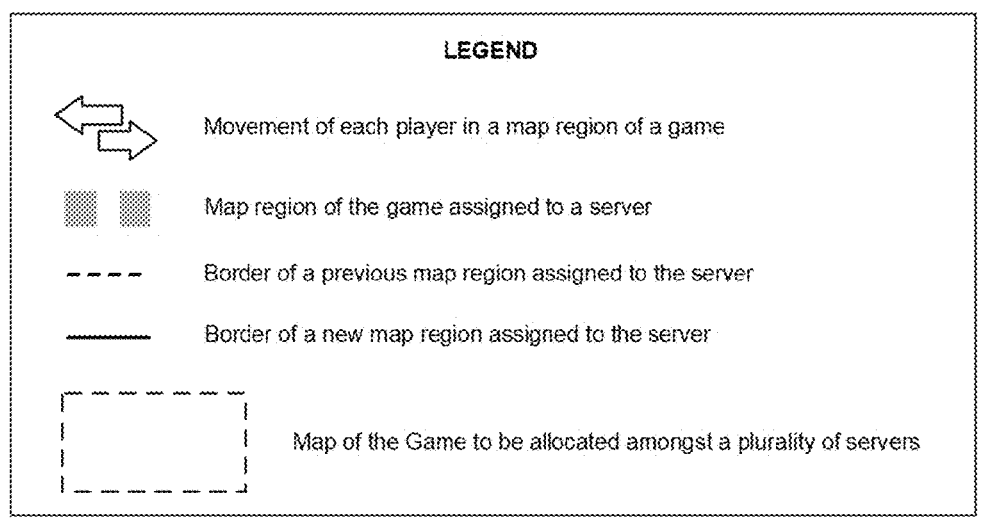
FIG. 5B

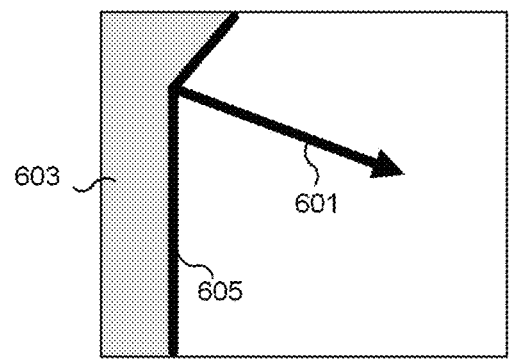
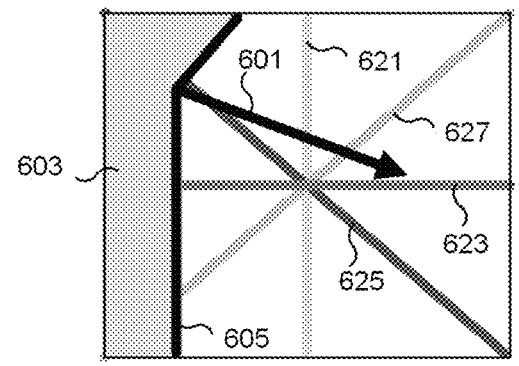
FIG. 6A  FIG. 6B
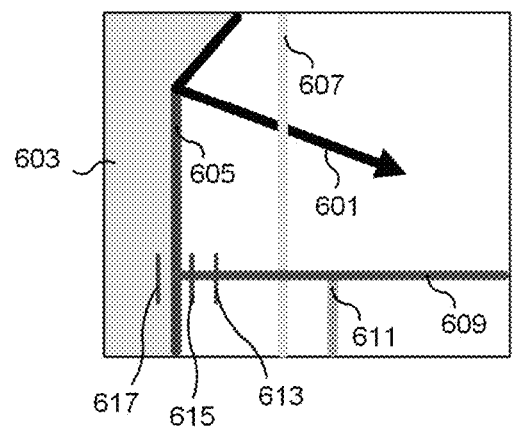
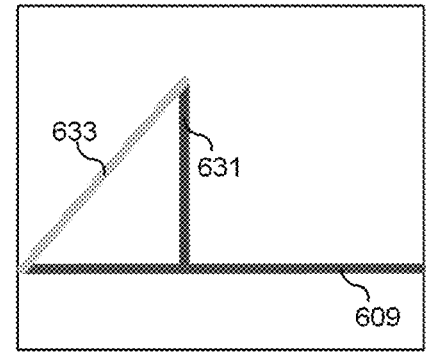
FIG. 6C  FIG. 6D

| Status | Status for incoming data transmissions (IDT) | Status for the ability of User Device (UD) to use Memory for Processing |
|---|---|---|
| Last Used | Address Y | Address Y (Use Next) |
| Being Used | Address X | Address X (In Use) |
| Next to Load | Address Z | Address Z (Reserve) |

FIG. 7A

| IDT Status | UD Memory Proc Status | Transmit data to user device | IDT Status | UD Memory Proc Status |
|---|---|---|---|---|
| 1A | 1B | Receiver address of block 1A swapped with Subprocessor address of block 3B | X | {Y or Z} |
| 2A | 2B | | Y | |
| 3A | 3B | | Z | X |

FIG. 7B

| IDT Status | UD Memory Proc Status | Transmit data to user device | IDT Status | UD Memory Proc Status |
|---|---|---|---|---|
| 1A | 1B | After data is fully transmitted address of block 1B swapped with block 1A address of block 1A swapped with block 3B | Z | X |
| 2A | 2B | | Y | {Y or Z} |
| 3A | 3B | | X | |

FIG. 7C

| IDT Status | UD Memory Proc Status | Transmit data to user device | IDT Status | UD Memory Proc Status |
|---|---|---|---|---|
| 1A | 1B | Lock receiver of user device Load, evaluate and process data | Z | X |
| 2A | 2B | | Y | {Y or Z} |
| 3A | 3B | | X | |

FIG. 7D

| Substep | Status for incoming data transmissions (IDT) | Status for the ability of User Device (UD) to use Memory for Processing | Step | IDT Status | UD Memory Proc Status |
|---|---|---|---|---|---|
| 7.1 | 1A 2A 3A | 1B 2B 3B | New Message Received | XYZ | ZYX |
| 7.2 | | | New Message Loaded | ZYX | XYZ |
| 7.3 | | | Screen Rendered | ZYX | XYZ |

FIG. 7E

| Substep | Status for incoming data transmissions | Status for the ability of User Device to use Memory for Processing | Step | IDT Status | UD Memory Proc Status |
|---|---|---|---|---|---|
| 7.1 | | | First Message Received | XYZ | ZYX |
| 7.2 | | | First Message Loaded | ZYX | XYZ |
| 7.3 | | | Screen Rendered | ZYX | XYZ |
| 7.4 | | | Secondary Message Received | ZYX | XYZ |
| 7.5 | | | Secondary Message Loaded | ZXY | YZX |
| 7.6 | | | Third Message Received | ZXY | YZX |
| 7.7 | | | Third Message Loaded | ZYX | ZXY |
| 7.8 | | | Fourth Message Received | ZYX | ZXY |
| 7.9 | | | Fourth Message Loaded | ZXY | ZYX |
| 7.10 | | | Second Screen Rendering | YXZ | ZYX |

FIG. 7F

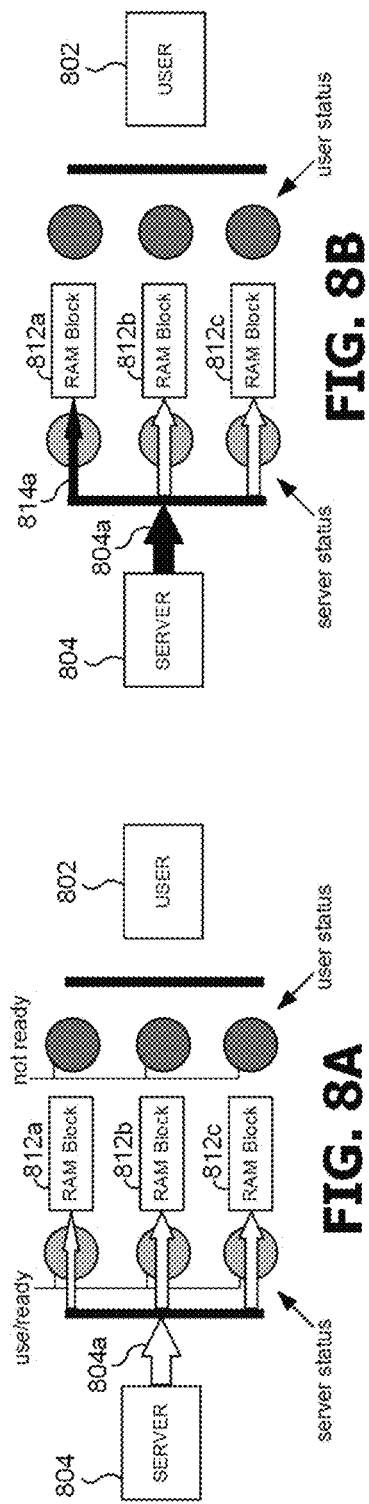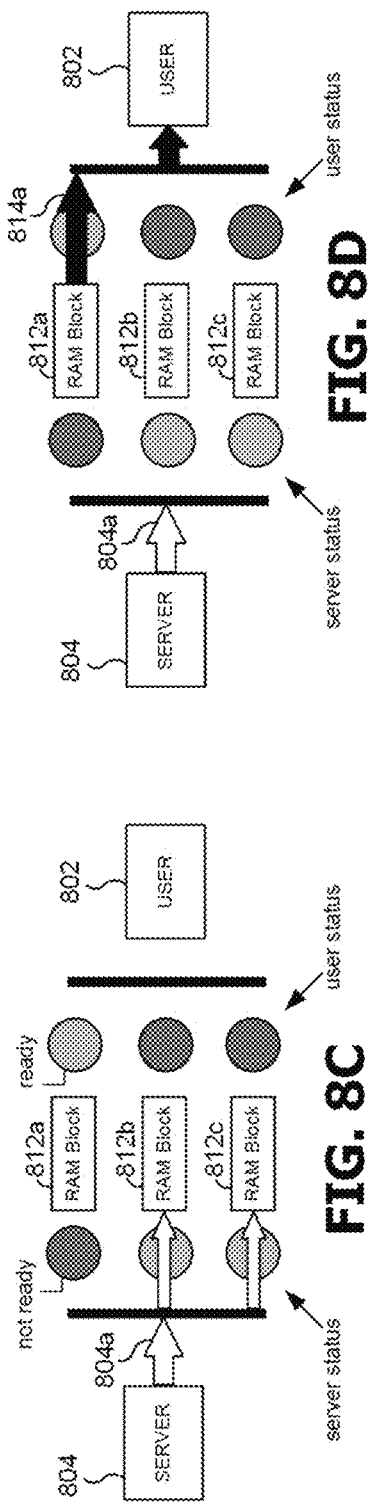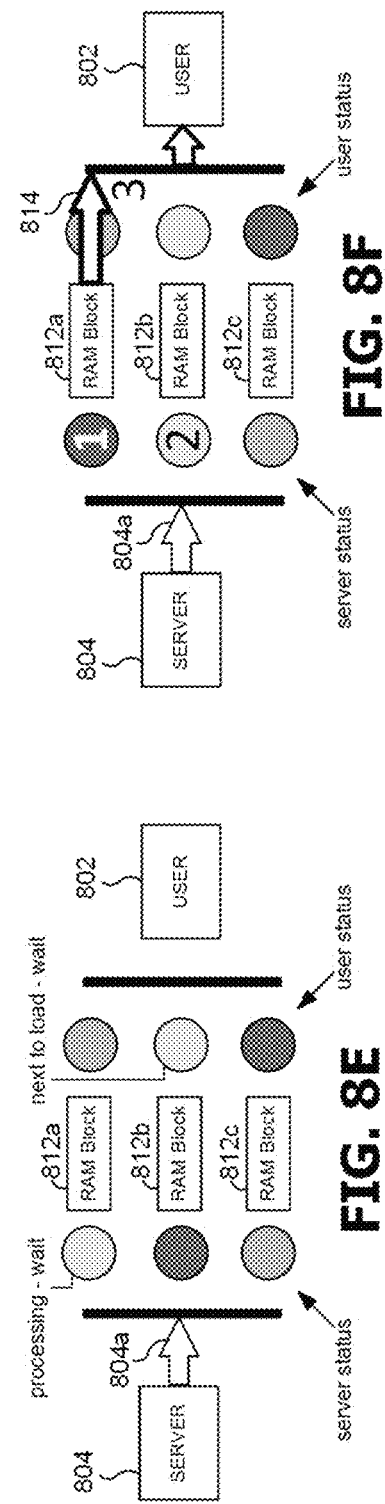

DEVICE AND METHOD FOR INTERACTIVE ENVIRONMENT PROCESSING AND COMMUNICATION

TECHNICAL FIELD

The present disclosure generally relates to computer systems and networks for receiving, processing, and communicating user information and communicating dynamic content based on the received user information, and more particularly, to three major aspects of processes and communications of highly distributed computer systems: communications, data management and organization and search optimization in multi-user, large scale, or massive online gaming or interactive environments.

BACKGROUND

As more and more modern games, interactive environments and simulations require tremendous computing and rendering power at the user's computing device, for example, deploying multiplayer online games often places a burden on both the hardware of the user computing device and the server capacity to handle large scale multi-user interactive games. To reach a broader audience, one solution proposes a centralized server model to handle all user and game data processing that minimizes hardware requirements of the user computing device. However, this solution requires limiting the number of users that can simultaneously join the online multiplayer game or interactive environment to prevent overloading the server with user data and processing. Another solution proposes using thin-client gaming systems where a user computing device runs from resources stored on a central server instead of a localized hard drive. However, little is known about the performance of such thin-client systems in different scenarios, and there is no systematic means yet to conduct such analysis. Since thin-client systems moves all of the communications of the data to the servers, the servers quickly become congested and prone to lag when many users join online. Another solution involves using peer to peer, internet, and standard networking that use bidirectional communication which requires individual lines to send and receive user and game data, that when distributed among massive multiplayer online games or interactive environments, quickly exacerbates server resources creating excessive server lag that ruins the online interactive experience.

Currently most online gaming utilizes one of two models: peer to peer for very small sized groups or client server for larger systems. Making matters worse, most client server games are going to "thin client" applications. One of the problems with thin client server games is that most of the inter-player interactions are handled by the server, despite the fact that server performance is not much better than individual client computers for the amount of processing power required. Thin client gaming model increases processing tasked to servers while decreasing the processing required by player systems (or user device).

Thin client gaming model is primarily used for two reasons: to keep players from cheating and to build trust. In thin client systems most of the information needed to play the game must be communicated regularly during the game instead of being installed on the user device before the game starts. This dramatically increases the size of the messages, slowing everything down. Thin client systems effectively shift the rendering process (the process of determining what the screen will show and how it will show it) to the server from the players systems.

The solution to these problems is to: decrease data needing to be communicated, decrease the calculations needed to be performed by the server, and better distribute between server and user the calculations needing to occur.

The solutions proposed and implemented often result in excessive server to user device communication, server processing, or synchronization between a user computing device and a sever that prohibits the number of simultaneous players or requires massive and costly infrastructure to facilitate a smooth multiplayer gaming or interactive environment. Therefore, there is a need to decrease the data needing to be communicated to and from the server, decreases the calculations needed on the server, and better distribute the calculations needing to occur between server and client systems in online multiplayer interactive games or environments to increase the speed of communications and reduce traffic between user device and server.

SUMMARY

One objective of this invention is to dramatically decrease the lag time of super large scale interactive video gaming. Currently, the scale mentioned is deemed impossible due to the number of messages that must be sequentially delivered, but those are artificial limitations due to the current standards and perceived messages. However, there is a simple solution if we think "outside of the box".

Another objective of the invention is for large scale computing applications based upon dimensional axes that can allow for scaling of computers to run database systems at a purchase cost of less than (1%) of the cost of an equivalent speed supercomputer. Now the approach attacks five areas for improving the overall performance: reducing messages, reducing traffic, reducing data transfer times, reducing search times/eliminating extraneous searches, and adapting server management to the game/task at hand: racing (1 dimensional) games or server swapping. By implementing the various embodiments of the hybrid communication model of the present disclosure, a reduction in costs of between 90% to 99% of cloud based database service servers can be achieved through a reduction in processing power and memory, using lower power devices such as personal computers rather than servers, and by distributing the work load to different computers and therefore obtaining full processing power. Additionally, the disclosed invention reduces inaccuracy up to 50% of AI random forest calculations when all modules and/or components of all modules (e.g. memory, communication, processing, etc.,) are operated independently from one another.

The components of the system include computing systems that are: servers; modules; receivers; transmitters; user devices (player stations); computerized devices such as personal computers, gaming consoles; a graphic user interface (GUI) or other processing systems; audit, testing and other stations; and communications lines and other support equipment. Any of the components of the system utilize more communications capacity then the current standard of a network interface controller (NIC), Wifi™ and/or combined NIC/Wifi™ communications module. The system can use a multiple server system that is connected to a plurality of the above components of the system or a workload from the server is divided to the above components of the system to distribute processing. The roles of the above components of the system function as servers and will vary depending on the type of application involved. The present invention is exponentially faster than existing systems because of the decreased message size and no significant communication delays as in the current systems.

Servers function to sort players along dimensional axes and inform players when they're swapped between servers. User devices function to inform their server of their minimum required data set, display other player's information based upon the latest update fully received, and handle additional communication that enhances the game. Audit, testing and other stations function to ensure transmissions aren't being corrupted, ensure output is correct, and display game statistics as needed to external users that are not playing. Also, interactive gaming is playing a game or operating a simulation. Thus, interactive gaming may be involved within this invention and/or system. Additionally, the above components of the system function known as servers will function to gather and distribute information both from and to any one of the above components of the system and any one of the above components of the system will function as I/O devices to give and receive user interactions and or strategic locations r elements for simulations. Moreover, the above components of the system will represent sub-models for artificial intelligence (AI) the model belonging to servers. The servers shall route the data to the above components of the system based upon the value(s) of the dimensional axis/axes. Large scale database servers shall issue the search to the above components of the system and shall merge lists from to the above components of the system into a final product. The above components of the system shall process the search, preferably be independently, but not necessarily required, and return their results to the above components of the system. In addition, the above components of the system and servers shall maintain a relationship as defined below: i) fixed relationship: the above components of the system will only talk to a specific server; ii) fixed zone relationship: (primarily used for gaming and simulations where the virtual location has a significant bearing on the impact of the final results) the above components of the system will be routed to specific devices based upon the location/center point of data of the above components of the system represents; iii) floating zone relationships: (primarily used in gaming and simulations where the distance between the above components of the system is a major factor of significance) the above components of the system will report their information to a designated server device until the they receive a message telling them to report their information to the different designated server. An alternative delivery method can be for every above component of the system to receive their designated servers' device every cycle; v) bridge relationships: (primarily used in cloud based database querying) the above components of the system will receive a designated device with each request and when that request is done/complete, the above components of the system will return the results to the servers. Communications lines and other support equipment, communicate in one direction, and handle communications either from user device to their designated server or from server to all user devices. Communications lines and other support equipment also handle special signals from server to user devices for adopting server management "server swapping".

Reducing the Number of Messages

We define variables that may be responsible for the total communication time in prior methods and architectures and the hybrid communication architecture and method of the present disclosure. First, we define the variables: N=number of user devices (or players), M=minimum sized message, S=number of servers, C=number of input ports (or channels).

We define the types of architectures: a first architecture being: peer to peer, where number of messages per user device=N−1, number of messages for all user devices=N*(N−1), and amount of data=M*N*(N−1)=$MN^2$. A second architecture being: client/server: where number of messages per user device to server=N, number of messages from server to user devices=N, number of messages=(Player to Server) (N*1)+(Server to Player) (N)=$2N^2$, and amount of data=M*2N=2MN.

A third architecture being: hybrid communication of the present disclosure: where number of messages per user device to each input port per server=N/S/C, number of messages per server to user devices=1, maximum messages across a communications channel=N/S or N/S/C depending on the degree of sharing/isolation of the communication lines. The more isolated the communication lines the less messages/traffic per cycle on that communication line.

Comparing the Architectures

Peer to peer: N*(N−1)*M $N^2$*M, client server: 1*N*M≈N*M, hybrid communication model: max(N/S/C)*M, or C*(N/S)*M. The hybrid communication model does actually produce N messages (of size M) going from servers to user devices. However, since they are on different communication lines, the time consumed is reduced by the number of lines involved (much like the number of lanes on a freeway). Note, there is also a payoff between the exclusivity of communication lines and the cost where line sharing is still possible but at the cost of the speed of the transmissions. So the fastest parts of the system will end up sharing lines to reduce cost without decreasing the effective speed of the entire system. This is something the audit systems will help evaluate.

Decreasing Traffic

The real goal of decreasing the number of messages and their size is to decrease the amount of network traffic. Since traffic generates delay according to the factorial scale {Factorial function=(X*(X+1)/2−1)*Y, where X=number of messages and Y=size of messages. For peer to peer architectures, X=$N^2$ and Y=M, so delay time=($N^2$($N^2$/2−1))*M=$N^4$*M. For client/server architectures, X=N and Y=N*M, so delay time=(N(N+1)/2−1)*(N*M)=$N^3$*M. For the hybrid communication architecture, the delay time=maximum delay time, and would either be the sum of all delay times (if the process is synchronous) or the maximum delay time of any subprocess (if the process can independently operate).

The more isolated the communication lines the less messages/traffic per cycle on that line. The maximum delay time would either be the sum of all delay times if the process is synchronous or the maximum delay time of any subprocess (if the subprocesses can independently operate). The delays in the hybrid communication model of the present disclosure being as follows: the delay for Players to Servers (Player Split) is $X^2$*Y, where X=N/S/C and Y=M, X=number of messages, Y=size of messages, and M=minimum sized message, results in ($N^2/S^2/C^2$)*M time, and the delay for Players to Servers (Server Split) is ($X^2$/C)*Y, where X=N/S and Y=M, results in ($N^2/S^2$)/C)*M time. Where a player split is when the communication channel C split at or near the player level. Whereas a server split is when all the players to a specific server share the same channel until they reach the server's input device. This is a cost vs performance balancing act, where more channels give better performance at the cost of more communication lines. The server to player communication network, unless servers are sharing a network, if they are, then the delay factor is the X=number of servers sharing the network and Y=number of players per server so the delay factor=(sharing−1)*(N/S) which is less than N regardless.

The disclosed subject matter relates to a user device, for environmental processing and communication, the device comprising a multiple and preferably independent communication module; the multiple and preferably independent communication module configured to communicably coupling to one or more communication networks, wherein the one or more multiple and preferably independent communication modules couple the user device to one or more servers, one or more processing modules, a memory module comprising instructions stored therein, which, when executed by the one or more processing modules cause the one or more processing modules to perform operations comprising, receiving one or more messages from the one or more servers through the one or more communication networks, extracting an information from the one or more messages, storing the extracted information in the memory module for immediate execution by the one or more processing modules. Through one or more communication networks, the user device and server establish a dedicated direct connection for all communications between the server and user device. The multiple and preferably independent communication modules write directly to memory (RAM).

The disclosed subject matter further relates to a method, for communicably coupling a user device to an interactive environment, comprising instructions stored therein, which, when executed by one or more processing modules cause the one or more processing modules to perform operations comprising, communicably coupling at least one device to one or more servers, receiving one or more messages from one or more servers, extracting an information from the one or more messages, storing the extracted information for immediate execution by the user device.

The disclosed subject matter further relates to a non-transitory machine-readable medium, for communicably coupling a user device to an interactive environment, comprising instructions stored therein, which, when executed by one or more processing modules cause the one or more processing modules to perform operations comprising, communicably coupling at least one device to one or more servers, receiving one or more messages from one or more servers, extracting an information from the one or more messages, storing the extracted information for immediate execution by the user device.

In the present disclosure, each user device performs the calculation of determining user positioning information in an interactive environment, such that user messages contain only minimal and relevant user positioning information and in game information to allow for optimal searching by a server thereby reducing the amount of evaluation time for each user device. Further, user device game processing facilitates asynchronous communication between server and user device, as each user device sends the minimal message (e.g. user positioning information) to the server, the server processes each user device message (e.g. user positioning information) and broadcasts to only relevant user devices based on the processed user device minimal message. Asynchronous communication further reduces the time needed to send and receive messages by eliminating feedback and confirmations expected from a bidirectional signal thereby providing an optimized distributed solution for server to user device communication that minimizes server processing and congestion in online multiplayer games and interactive environments. Moreover, since each user device performs in game calculation to provide a minimal sized message to the server, the speed at which a server processes user messages and in turn broadcasts messages to each user device is further reduced.

In the present disclosure, each server has its own unique channel dedicated for communicating directly with each user device. The server may process each user device minimal message that includes a user's positioning information within a game or interactive environment to group or allocate user devices to an optimal server based on user positioning information. Thus, server congestion is further minimized by distributing user devices among multiple servers, such that each unique channel of each server is dedicated to receiving user device messages of one user device, while broadcasting one message to all user devices instead of sending point to point messages for users within a specific network or positioning in a game or interactive environment. Since device to server communication is through a minimal message, and server to device communication is by broadcasting one message to many user devices within the same network or positioning location in the game or interactive environment, server processing time for each user message in a large scale multi-user interactive environments may be exponentially reduced.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features, objectives, and advantages of this application become more apparent by reading detailed descriptions of non-limitative embodiments made with reference to the following accompanying drawings.

FIGS. 5A-5C are exemplary diagrams illustrating an exemplary zoning used in interchangeable or flexible servers that may be used in accordance with one or more embodiments of the present disclosure.

FIGS. 6A-6D are exemplary diagrams illustrating object visibility and object selection communication between the server and user device used in accordance with one or more embodiments of the present disclosure.

FIGS. 7A-7F are exemplary diagrams illustrating receipt of server messages and screen rendering operation of the user device memory in response to server communication used in accordance with one or more embodiments of the present disclosure.

FIGS. 8A-8H are exemplary diagrams illustrating receipt of server messages and dedicated memory storage and operation of the user device memory in response to server communication used in accordance with one or more embodiments of the present disclosure.

DETAILED DESCRIPTION

Figure 1:
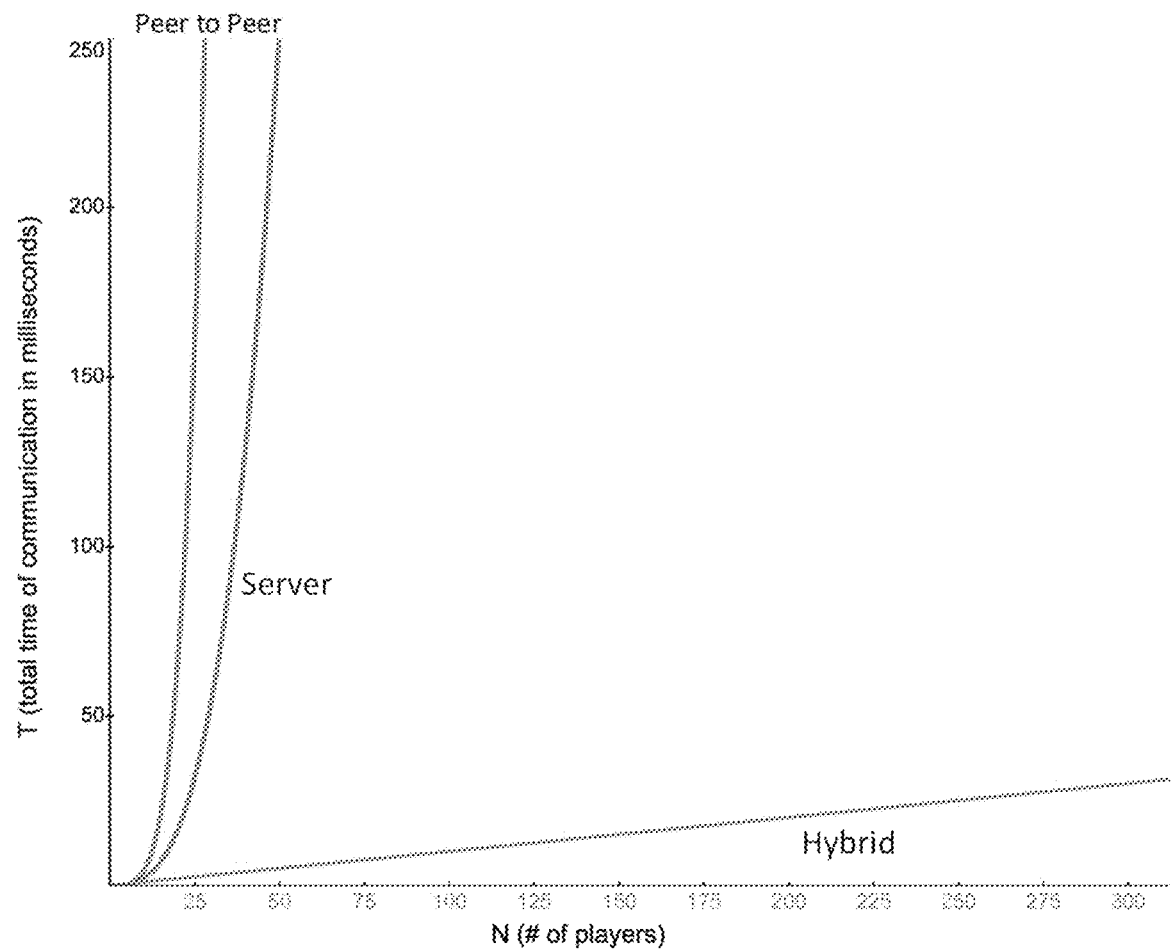
FIG. 1 is an exemplary diagram illustrating a comparison of total communication times between peer to peer communication method, server (thin-client) communication method, and the hybrid communication models of the present disclosure in accordance with one or more embodiments of the present disclosure.

In the centralized server model, for example thin-client systems, the central server performs most of the game processing. The processing time is equivalent to the $(N^2 \times C)/V_S$, where N is the number of players, C is the processing constant, and $V_S$ is the processing speed of the server.

In the distributed model, for example peer to peer systems, there are generally two communication options, on demand communications and synchronized communications. In on demand communications, the processing time is equivalent to $(N \times C)/V_U$, where N is the number of players, C is the processing constant, and $V_U$ is the processing speed of the user's computing device. In synchronized communications, each player receives updates at the same time, and the processing time is equivalent to $(N \times C)/V_T$, where N is the number of players, C is the processing constant, and $V_T$ is the processing speed of the user's computing device with the slowest processing speed.

In the present disclosure, an exemplary hybrid model is presented. In the hybrid model, the user computing device has a dedicated communication channel with the server, the user computing device provides minimally sized messages (e.g. user status updates and user location) to be processed by the server, and the server broadcasts one message to all user devices within a group based on positioning location within the game and/or user's network location. In the hybrid model, the processing time is equivalent to $(N \times C)/(S \times V_S)$, where N is the number of players, C is the processing constant, S is the number of servers and $V_S$ is the processing speed of the server.

For each model above, communication times and delay factors are further discussed below. In all models, the communication time depends on two factors, the number of messages to be delivered and the time it takes for each message to be delivered. The former is discussed in detail below for each communication model, for the latter, the time it takes for each message to be delivered depends primarily on the time it takes to create the message. The most important factor to consider is the content of the message (data and size), other factors involved are the time for a message to reach its destination and the time to receive the message.

In the peer to peer communication model, each player will send a message for every other player with their data.

So each player will send a number of messages $M=(N-1)$, where N is the number of players, and the total number of messages that will be sent across the network, $M_T$, is then $M_T=N \times M=N \times (N-1)$, or approximately, $M_T=N^2$ total messages that will be sent across the network.

The total communication time, T, is equal to the total number of messages multiplied by the time it takes for each message to be delivered, $T=M_T \times (M_C+M_S+M_V+M_D+M_R)$.

Where the message creation time, $M_C$ is a constant value, $M_C=k1$, the message size, $M_S$ is a constant value determined between server and user computing device, $M_S=k2$, the message travel time, $M_V$ is a constant value, $M_V=k3$, and the message receipt time, $M_R$ is a constant value depending on user device, network, and server connection, $M_R=k4$. Summing up the constants, k1, k2, k3 and k4 yields, $k=k1+k2+k3+k4$ for message creation time, message size, message travel and message receipt time.

For the message delay time, $M_D$, each player N must send 1 message to every other player (N−1), so the number of message delays is equal to the number of players N multiplied by the number of messages $M=(N-1)$. The message delay time $M_D$, is then $M_D=M \times N=(N-1) \times N$, $M_D \gg N^2$.

Thus, the total communication time in the peer to peer communication model is $T=M_T \times (k+M_D)=N^2 \times (k+N^2)=kN^2+N^4 \gg N^4$, which places a hard limit on peer to peer networks games to groups of 2-16 players.

In the server based (thin-client system) communication model, each player will send a message for every other player with their data.

So each player will send a number of messages N, and the server will in turn send a number of messages N to each player. The total number of messages that will be sent across the network, $M_T$, is then $M_T=2 \times N$, $M_T=2N$ total messages that will be sent across the network.

The total communication time, T, is equal to the total number of messages multiplied by the time it takes for each message to be delivered, $T=M_T \times (M_C+M_S+M_V+M_D+M_R)$.

Where the message creation time, $M_C$ is a constant value h1 for the player or N for the server, $M_C=h1$ or N, the message size, $M_S$ is a constant value h2, determined between server and user computing device, $M_S=h2$, the message travel time, $M_V$ is a constant value, $M_V=h3$, and the message receipt time, $M_R$ is a constant value h3 for the player or N for the server depending on user device, network, and server connection, $M_R=h4$ or N. Summing up the constants, h1, h2, h3 and h4 yields, $h=h1+h2+h3+h4$ for message creation time, message size, message travel and message receipt time.

For the message delay time, $M_D$, each player must send N messages and each server must allocate N networking devices to feed all messages N into the server, so the number of message delays, $M_D$ is equal to the number of players sending each message that needs to be allocated by the server, $M_D=2 \times N*N$, $M_D \gg N^2$.

Thus, the total communication time in the server based (thin-client system) communication model is $T=M_T \times (h+M_D)=2N \times (h+N^2)=2hN+2hN^3 \gg N^3$.

In the hybrid communication model of the present disclosure, each user device has a dedicated communication channel with the server, so the total communication time depends only on the message size and message transmission time, that is the communication time between server and user device on the dedicated channel.

So each player will send a number of messages=N, and players will be distributed among a number of servers S, each server allocates each user device communication to one of a number of dedicated channels C of that server. For each player, the total number of messages that will be sent across the network, $M_T$, is then $M_T=N/S/C$. For the server, the total number of messages that is sent from the server to all users is one broadcast message, $M_T$, is then $M_T=1$.

For each player, the message size, $M_S$, is a sum of constant values for the player's information, m1, message header, m2, and message footer, m3, $M_S=m1+m2+m3=m$. For each server, the message size, $M_S$, is a sum of constant values for the message header, n11, and message footer, n22, with all player's information (N/S). $M_S=n11+n22+N/S$, $M_S=n+(N/S)$.

The total communication time, T=Maximum {(Player messages=$M_T \times M_S$), (Server messages=$M_T \times M_S$)}, T=Maximum {m×(N/S/C), 1×(n+(N/S))}, taking the maximum total communication time, T, yields, $T \gg N/S$.

The comparison of total communication times between peer to peer communication method, server (thin-client)

communication method, and the communication method of the present disclosure are listed in Table 1 and illustrated in FIG. 1. FIG. 1 illustrates the time factor differences for each additional user device N connecting to one server in the peer to peer, server, and hybrid communication models of the present disclosure. As shown in Table 1, for each increase in the number of players N, in peer to peer networks, the total communication time increases exponentially by $N^4$, which is generally why is why P2P Networks are normally only groups of 2-16 players. In server based communication networks, the total communication time increases exponentially by $N^3$, slightly improved over P2P networks. In the communication method of the present disclosure, the total communication time increases by a factor of N/S at most.

TABLE 1

|  | Peer to Peer | Server | Invention/Hybrid |
|---|---|---|---|
| Number of Messages | $N^2$ | N | N/S |
|  |  | N | 1 |
| Message Size | 1 | 1 | 1 |
|  |  | N | N/S |
| Total Data Transmitted | $N^2$ | N | N/S |
|  |  | $N^2$ | N/S |
| Delay Factor | $N^2$ | N/C | N/S/C |
|  |  | $N^2$ | Ø | where N is the number of players; S is the number of servers and C is the number of connections/server and with the boxes of Table 1; the top line is the player to server or other player for peer to peer and the bottom line is the server to player.

In the hybrid model of the present disclosure, server to client communication is through a dedicated channel, where each server needs to send only 1 message per cycle, and messages from each server is never delayed due to network traffic. As shown in Table 1 and FIG. 1, player to server delays are exponentially reduced. The number of delays will be the number of players communicating with that server per number of input ports or channels.

There are two factors that contribute to the message delay, internet delays and internal network delays. For internet delays, there are point to point connection delays between user device and server, where to facilitate a connection with the server, a user device may need to connect to and route messages and communications through a plurality of intermediary computers. For internal network delays, in large multiplayer online gaming or interactive environments, each user device needs to be allocated to a server based on a multi-level network architecture. The network architecture needs to allocate a large number of user devices to a plurality of networking devices to handle and manage traffic from hundreds or thousands of users. In internally routing the traffic, the networking devices themselves introduce additional internal network delays.

In peer to peer networks, internal delay is introduced by the limited number of ports that each switch would need to reserve for each player then route other players to the next switch. Since in peer to peer networks each player must send a message to every other player, an internal network delay for each player communicating with every other player is introduced in peer to peer networks. Each switch would have a number of players attempt to deliver local messages equal to the {# of Ports}-2, since the switch needs to reserve 1 port to route traffic to the Parent or Next Switch in the chain and reserve 1 port for itself. The remaining parents must have a message sent up to the parent or next switch in the chain, we would have {# of Players}-{# of Local Players}={# of Ports}-2 to feed messages up. And we should have the same number of messages coming down from the parent of the next switch in the chain {# of Players}-{# of Local Players}={# of Ports}-2, which generates a number of delays=2×{# of Players}-2×{# of Local Players}+{# of Local Players}. We would have delays for each player equal to the {# of Players}, but each player must send 1 message to every other player, so it isn't {# of Players} but ({# of Players})^2 in delays.

In server (thin-client) networks, a server would have to augment the number of input channels it has with networking devices to feed all of the messages into the server. So It would need {# of Players}/{# of Input Channels} of networking devices to connect all of the players to the game. During Input, the delay factor would be {# of Players}/{# of Input Channels}-1. During output, it would have the same delay factor, but the size of the message would be {# of Players} bigger. So the delay factor would be the {# of Players} because of the increased file size.

In the hybrid communication network, we distribute players among server and server channels. So the message delay, it would be {# of Players}/{# of Servers}/{# of Input Channels} of networking devices to connect all of the players to the game. So during Input, the delay factor would be {# of Players}/{# of Servers}/{# of Input Channels}-1. During output, since we're using broadcast technology, there would be no message delay. Only the one message would be broadcast, and it wouldn't have to wait for any other message to be delivered. So the delay factor becomes a constant and is not related to the {# of players}.

Server to user device communication in a large scale multi-user interactive environment are described herein. For every server there may be assigned many user devices, each user device having a unique receiver for each server, and each server having a unique receiver for every user. The server having one output channel to broadcast to all user devices. All users transmitting to one server but receiving communications from every assigned server. The server to user device communication may comprise of broadcast messages to obtain user device information (Internet Protocol (IP) address, location, bandwidth, latency), as well as user status updates and user or player spatial positioning (user location within the interactive environment), user environment information (e.g. terrain, objects, elevation, etc.), user id, map information, user stats, user health, user velocity and facing, angle, direction, speed, power, inventory, skills, abilities as well as other information for providing a multi-user interactive environment. Additionally, using minimum data messages with the present disclosures further reduces message creation time, message transmission time, player to server delay time, server processing time, server time to make object and player location lists, and server time to transmit object and player location lists.

Upon receiving user and device information from multiple user devices, the server may assign users or players to an appropriate server based on server congestion, user spatial position information, user device information, nearby players and player stats within the interactive environment. The server may also request user metadata, for example, an indication of any one or more of a time, a frame, a location, an angle, a direction, a speed, a force, or other information associated with a user event, user environment, and object or image data within the user environment. The user device may then send, to a server, information including an indication of the user event, user environment, and interactable objects within the environment.

It should also be appreciated that the server described in the present disclosure is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules.

A module may comprise of circuitry or components to facilitate storage, processing, display, input/output, and communication. For example, a processing module may comprise of circuitry and devices of which only a partial list includes microprocessors, microcontrollers, graphic processors, network processors, PLDs, PLAs, PALs, FPGAs, CPLDs, DRAM, Flash, MEMS, sensors, photo-sensor arrays, CCDs, baseband processors, CAMS, configurable and reconfigurable circuits, passive circuit arrays, analog circuits, hybrid circuits and mixed signal circuits, programmable circuits, in which a circuit design may be implemented responsive to loading a stream of configuration data in combination with one or more other circuits and/or systems, for example, an application specific integrated circuit (ASIC) or a system-on-chip. A memory module may contain BIOS, firmware, memory (e.g. ROM or RAM), storage (e.g. EEPROM), etc., for measuring data, storing data, and/or programming or reprogramming the IC. Additionally, the processing module may contain various devices and/or circuitry for processing (e.g. receiving, measuring, and converting) signals to data (and vice versa), for example, A/D and/or D/A conversion circuitry or may connect to another component, for example, a comparator for such processing. Each server and user device may include one or more multiple and preferably independent communication modules. Each multiple and preferably independent communication module may include one or more electronic devices coupled through electrical traces or pads, and/or specifically through a bus or any form of intra-board communication, network interface, antenna, one or more memory and processing modules, and one or more receivers and one or more transmitters for facilitating dedicated communication between other servers, user devices, and multiple and preferably independent communication modules. Other modules may include a printed circuit board (PCB), a motherboard, or a main logic board (MLB) or the like, having a plurality of electrical or optical connections for input and output devices, firmware, sensors, I/O ports, storage, memory, and various other components and hardware. Similarly, in some embodiments the functionality of some of the illustrated modules may not be provided and/or other additional functionality may be available.

Figure 2:
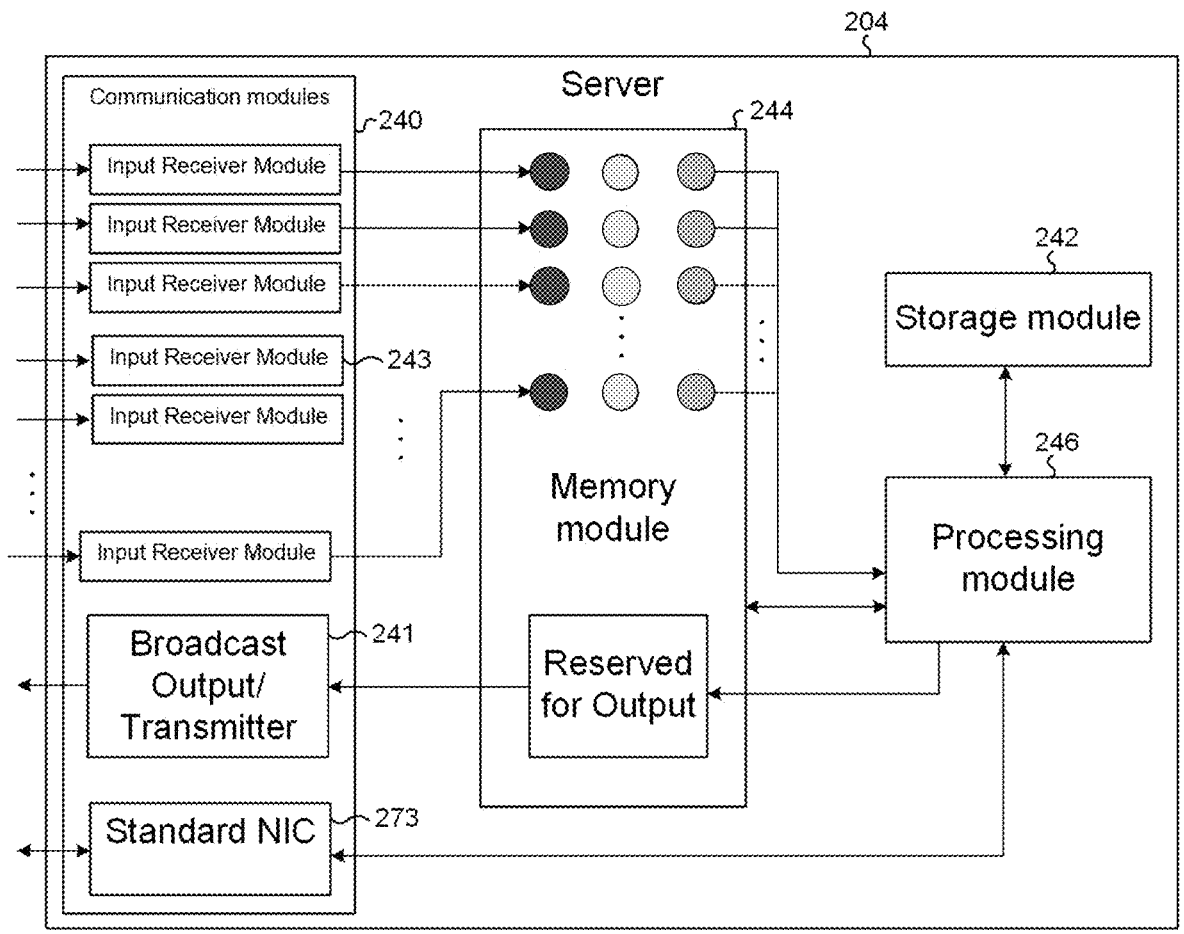
FIG. 2 are exemplary diagrams illustrating an exemplary server that may be used in accordance with one or more embodiments of the present disclosure.
Figure 3:
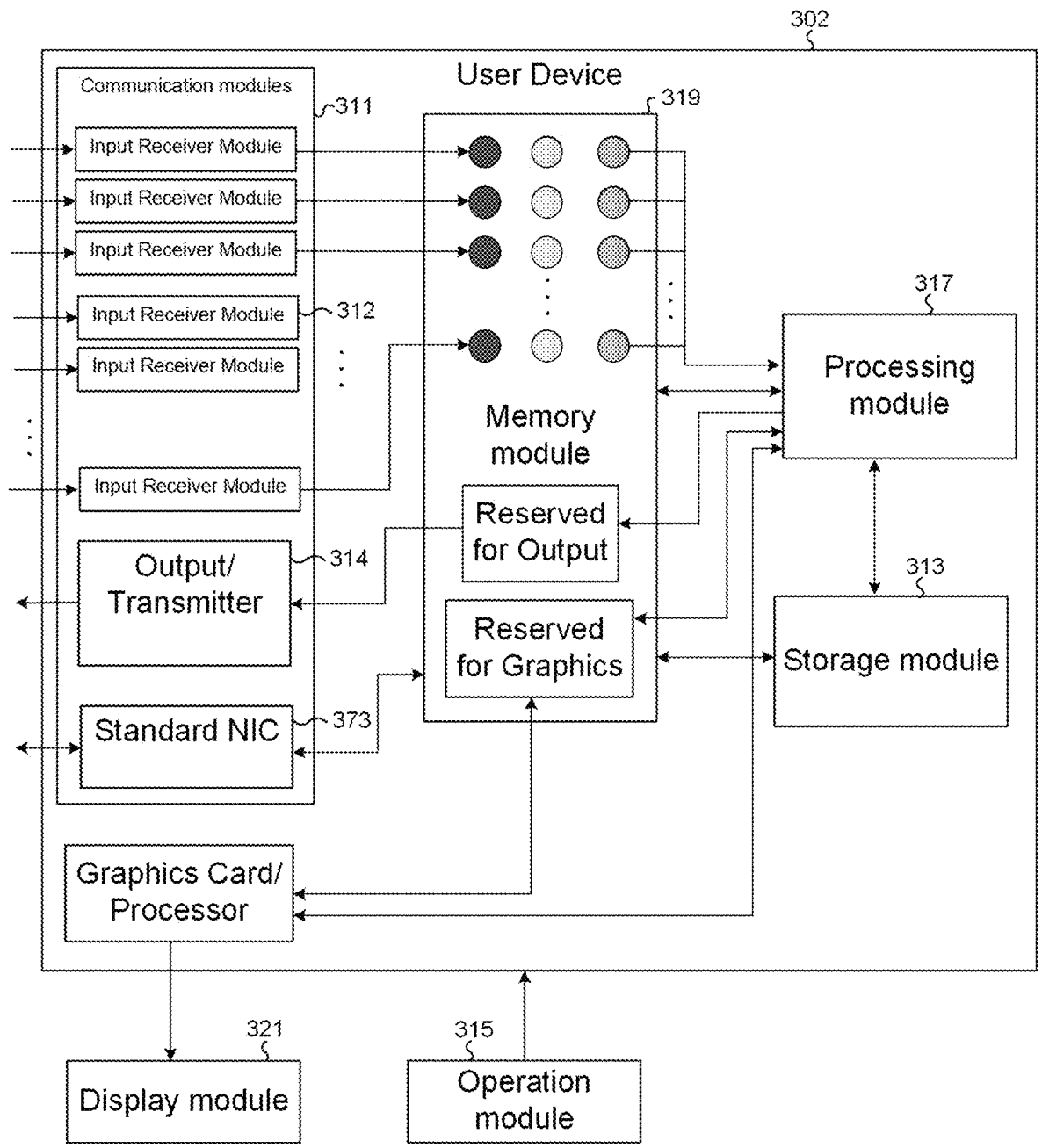
FIG. 3 is an exemplary diagram illustrating an exemplary user that may be used in accordance with one or more embodiments of the present disclosure.

FIGS. 2-3 illustrate an exemplary diagram of server 204 and user device 302. FIG. 2 is an exemplary diagram of server 204. As illustrated in FIG. 2, the server 204 includes multiple and preferably independent communication module 240 for connecting to one or more communication networks and communicating with at least one user device 302 and/or one or more servers 204. The user devices 302 and servers 204 communicate through the communication network which may be a public, private, wired or wireless communication network, for example. Through one or more communication networks, the user device 302 and server 204 establish a dedicated direct connection for all communications between the server 204 and user device 302. The server 204 further comprises of multiple and preferably independent communication module 240, storage module 242, memory module 244, and processing module 246. The server 204 further includes transmitter 241 for broadcasting message to user devices 302, a plurality of server input receiver modules 243 for receiving messages from user device 302, and standard network interface card 273

The multiple and preferably independent communication module 240 includes a communication interface circuit for connecting the server device 204 to the communication network. The multiple and preferably independent communication module 240 transfers data received from user devices 302 through the communication network, to the processing module 246. Moreover, the multiple and preferably independent communication module 240 transmits data received from the processing module 246 to the user device 302 through the multiple and preferably independent communication module 240. Through one or more communication networks, the user device 302 and server 204 establish a dedicated direct connection for all communications between the server 204 and user device 302.

The server 204 may send one to three types of messages: 1) broadcast message from server to all players, 2) server selection updates if using updateable servers in a 2+ dimensional universe that could be managed using a conventional network, or 3) inter-player communications which could be managed using a conventional network.

The storage module 242 may include at least one of a semiconductor memory, a magnetic disk device, and an optical disk device, for example. The storage module 242 stores various programs and data to be used to control the server 204. The storage module 242 stores program, data, and/or instructions for processing server 204 or user 302 requests and data. Moreover, the storage module 242 also stores program, data, and/or instructions for performing in-game or in-application event processing related to user 302 requests, for example, storing application or game initialization data, game, application, and user account and verification, user and environmental information and/or object positioning data, etc. Furthermore, the storage module 242 also stores one or more tables representing the association of the identification number (ID) of each user, other active servers 204, and/or user devices 302, as well as game and/or application data sets provided by the user (referred to as a "user table" or "user list"). In addition, the storage unit module 242 may also store temporary data related to predetermined processing.

The memory module 244 of the server 204 may store user data or user records comprising of user information (e.g. profile, account, stats, rewards, rankings, etc.), user positioning information and environmental information (e.g. object details, locations and distances), game version information and map information (map version, topology, etc.). The memory module 244 may store and process user data from all user devices 302 as received by user device 302 messages. In FIG. 2, memory blocks for memory module 244 are shown as circles, where blocks not in use/ready are white circles, blocks being processed/waiting are shaded grey circles, blocks in use/not ready are shaded black circles.

The server 204 then processes user device 302 messages, compiles a message containing list of pertinent user data to be broadcast to all user devices 302, compresses the message, then transmits the message to all user devices 302.

The processing module 246 includes one or multiple processors and peripheral circuits thereof. The processing module 246 carries out the application or game, and performs processing for communicating the user data associated with one or more user devices 302. The user data comprises of game or application initialization information, user information, environmental information (e.g. terrain and object information), the status and location of other user devices 302 and servers 204.

FIG. 3 is an exemplary diagram of user device 302. As illustrated in FIG. 3, the user device 302 includes multiple and preferably independent communication module 311 for connecting to one or more communication networks to communicate with at least one server 204 and one or more user devices 302. Through one or more communication networks, the user device 302 and server 204 establish a dedicated direct connection for all communications between the server 204 and user device 302. The user device 302 may be a remote computing device (e.g. smartphone, laptop, IP TV, etc.), as long as it capable of communicating with the server device 204 and running the application or game. The user device 302 may include multiple and preferably independent communication module 311, storage module 313, processing module 317, operation module 315, memory module 319, and display unit 321. The user device 302 further includes transmitter 314 for transmitting messages or data to server 204, a plurality of user input receiver modules 312 for receiving messages from server 204, standard network interface card 373, and graphics card/processor 393.

The multiple and preferably independent communication module 315 includes a communication interface circuit, for communicating with servers 204 and other user devices 302. The multiple and preferably independent communication module 315 may include wired and wireless interfaces for connecting directly to the Internet (e.g., via a cable modem, fiber-optic line, satellite, or a Digital Subscriber Line (DSL)) and to the communication network as well as various short distance interfaces, for example, that conforms with the communication standard such as IrDA™, Bluetooth™, or ZigBee™, for exchanging user data between nearby user devices 302.

The user device 302 may send out a minimum required update information comprising in-game player information, for example, user ID, image ID, heading 2D (x,y) or 3D (x,y,z), velocity/speed, damage taken, attack ID, and damage inflicted, etc.

The storage module 313 may include at least one of a semiconductor memory, a magnetic disk device, and an optical disk device, for example. The storage module 313 stores various applications, games, and user, application and/or game data to be sent to the server 204. The storage module 313 stores program, data, and/or instructions for processing user requests and data. Moreover, the storage module 313 also stores the application and game data, game initialization data, background data, and user account information, user and environmental information and/or object positioning data, etc. Furthermore, the storage module 313 also stores one or more tables representing the association of the identification number (ID) of other players or users, other active servers 204, and/or user devices 302, as well as downloaded content for the game and/or application from servers 204 or another user device 302. In addition, the storage unit module 313 may also store temporary data related to predetermined processing.

The processing module 317 includes one or multiple processors and peripheral circuits thereof. The processing module 317 carries out the application or game, and performs processing for communicating the user data associated with one or more user devices 302. The user data comprises of game or application initialization information, user information, environmental information (e.g. terrain and object information), the user status and location of user device 302.

The operation module 315 may be any input device, as long as being capable of operating the user device 302, and examples are a touch pad, a keyboard, mouse, wireless and infrared devices, motion and acceleration sensing devices, and the like. Moreover, the display module 321 may be any device, as long as being capable of displaying a screen, and examples are a liquid crystal display, an organic EL display, projectors, plasma tv, and the like.

The memory module 319 of the user device 302 may store user data or user records comprising of game and/or application initialization information, user information, user positioning information and environmental information, for example, object and background information. In FIG. 3, memory blocks for memory module 319 are shown as circles, where blocks not in use/ready are white circles, blocks being processed/waiting are shaded grey circles, blocks in use/not ready are shaded black circles. The memory module 319 may load most of the application or game data for the user selected application or game as stored on storage module 321. The memory module 319 may also contain game or application initialization information for beginning a user session or gameplay or connecting to a game or session in progress provided by one or more servers 204. Moreover, the memory module 319 may communicate, for example, user positioning information on a user map to one or more servers 302. Based on the information provided by user device 302, the server 204 may search through the user provide position information, process the user positioning information, and update the user environment and display nearby players/users on the user map. The server 204 may search user data or user records for the current user position information provided by memory module 319 to initiate a connection with another server 204 with less congestion or pool nearby player/users on the same server 204 to provided better real-time user positioning information. The memory module 319 may also contain user information that is passed to one or more servers 204 during a user session.

In some exemplary embodiments, the user device 302 may have functions equivalent to those of the server 204, and can produce an effective equivalent to that produced by the server 204. A computer program for causing a computer to execute the respective functions of the processing module 246 of the server 204 and the processing module 317 of the user device may be provided in a form recorded on a computer readable recording medium such as a magnetic recording medium or an optical recording medium. It should be understood that various changes, substitutions, and modifications can be made to the present disclosure by those skilled in the art without departing from the spirit and scope of the present disclosure.

In some exemplary embodiments, user device 302 input to each server 204 may be through dedicated network, and user device 302 output from each server may be through the same or another network. In some exemplary embodiments, there may be 2*{Number of Servers} communications networks 230. As with several or numerous communication networks, there may be several or numerous multiple and preferably independent communication modules 240 and server multiple and preferably independent communication modules to facilitate a dedicated communications network between the user device 302 and the server 204.

The multi-user interactive application or game may be installed on the user device 302. Upon initialization of the application or game, the user device 204 is assigned to server 204, the server 204 communicates the user's starting location to the user device 302. Subsequently, the server 204 receives location information from all user devices 302, calculates a new list of player locations based upon the dimensional axes (directional heading in the application or game) of each player in the multi-user interactive application or game, and communicates by broadcast message to all user devices 302 the location of all players/users in the application or game. The user device 302 receives the list of player/user location information for other players from server 204, compiles a list of visible objects from the list of player/user location information and from in game information (e.g. map data), renders/displays the information on the player/user screen, updates the player/user location based upon the input/actions of the player, and sends that information to the assigned server 204. Therefore, an exemplary role of the server 204 is to compile sorted lists of minimal player/user information along with each player's/user's dimensional axes (and player statistics from multiple players if needed), and transmit the sorted list of player/user location information to all player/users.

Once user device 302 is connected to server 204, the user device 302 may provide status updates comprising of the user information and object information that includes a minimal list or record of current user positioning information and a list or record of minimal object information based on the current user position in the game. To efficiently provide real-time updates of other user locations within the game, server 204 communication (e.g. input) to user device 302 is directly written to the user device memory module 319 (e.g. write to (RAM) block) to be immediately accessible by the user.

The user information may comprise of one or more user messages that is communicated from memory module 319 of user device 302 to server 204 through output/transmitter 314. The user message may comprise of a header, the header may include information on the contents of the message, and the block locations (minimal location information) for obtaining user positioning locations that the server 204 may need to process and find the user position in the game. The header may include a first record (first location) block and last record (last location) block for minimal current location information for each player. The header may include intermediary location information the server 204 will need to process to obtain an accurate history and real-time user positioning location within the game. The user message may include a block of records of each individual player's Minimal Location Information (MLI) moving from the first location to the last location to arrive at a current player/user location. The user message may also include a tail, which may contain a checksum to ensure the received message is not corrupted. In some embodiments, where the server type is a flexible or interchangeable server, and the user is not a member, the starting location will always be either the first location or last location.

1. Similarly the object information may comprise of one or more server messages that is communicated to the memory module 319 of user device 302 from broadcast output/transmitter 241 of server 204. The server message may comprise of a header, the header may include information on the contents of the message, and the block locations for obtaining object positioning locations that the user device 302 may need to process and display in the game based on the current user position. The header may include a first record (first location) block and last record (last location) block to obtain current location information for each player/user. The header may include intermediary object location information the user device 302 will need to process to display object locations and distances accurately in real-time based on the user positioning location within the game. The server message may include a block of records of each object location sorted by the distance from the user's current positioning location moving from the first location to the last location. The server message may also include a tail, which may contain a checksum to ensure the received message is not corrupted. In some embodiments, where the server type is a flexible or interchangeable server, and the user is not a member, the starting location will always be either the first location or last location. Additionally, the server messages includes one or more user details within the interactive environment, and wherein each user detail includes a user identification, a model number, a position, a heading, a velocity or damage.

The memory module 319 may allocate a plurality of memory blocks for each user input receiver module 312, where each user input receiver module 312 may receive one or more messages from each coupled server 204. The processing module 317 may write the message contents received by each user input receiver module 312 directly to the plurality of memory blocks. The message contents may then be retrieved by the user device 302 to obtain at least one of one or more user status messages for one or more other user devices from the message. The one or more status messages may include, for example, at least one of user minimal location information moving from the first location to the last location, user stats, and object location information in the interactive environment. The game data, multimedia, videos, and additional environmental data or game data may be stored separately on the user device storage or memory and not received or transmitted during the game or interactive session. Therefore, the contents of the one or more messages provided by the coupled server 204 may contain minimal information such as, only user location information, object location information, and user status information of all user devices coupled to the same server in the interactive environment.

The algorithm of the present disclosure results in a search time of T=M+E, where N=Number of entries, M=Number Selected, E=Number of Errors. As shown in the server sorting algorithms, the more you can do to reduce the errors, the smaller value of E. Further, number of errors, E, should (certain environmental/terrain models may produce a huge number of false positives) have a value from M to log(N). Various search and sort algorithms may be used to provide an efficient means of communicating user and object placement and location in a real-time multi-user interactive environment. For example, bubble sorting results in a search time=$N^2$, binary-tree sorting results in a search time=$M*\log(N)$.

Referring to FIG. 2, various types of servers 204 may be used in the present disclosure, and need not be limited to a certain type of server 204 for user device 302, application, environment, simulation, or game. Based on user needs or application or game demand, various types of servers 204 may be used. For example, a fixed server, where a user is connected to one server and remains connected to that server may have an added benefit of reduced network infrastructure and complexity, but may increase searching time for a user or player positioning location.

A flexible server, may allow users to connect to a specific server when their user or player location corresponds to an area owned by that server to provide more efficient searching while in game. If there are zone based visibility limitations, flexible server setup may provide more efficient user position searching in game as users may switch to servers based on specific playing zones or areas that may drastically reduce the number of records needed to be created by memory module 319 and searched by server 204. Each user in a flexible server will be sorted from start to exit, that would be more efficient for identifying nearby fellow users or players. In a flexible server, some drawbacks may include an increased network infrastructure and possible server imbalances and congestion when a player leaves the zone assigned to their server, they need to communicate their information to a new server. In addition, an excessive number of players might conjugate in the same server, reducing that server's effective processing time.

An interchangeable server may be more efficient for searching while the user is in a particular zone or area in the game where zone based visibility limitations do not exist. In an interchangeable server, some drawbacks may include increased network infrastructure and server balancing processes probably every cycle (maybe requiring an additional channel).

The processing module 317 of the user device 302 may perform the following processing steps to obtain a range of values for the user position information. The user position information is then pooled into a list or record then loaded into the memory module 319 as the user information data to be communicated to the server 204. The processing module 317 may begin by acquiring values or coordinates of the starting location of the user by, for example, a first location, a range of subsequent locations, then a last location. The values are then used to calculate a range of values, for example, last location—first location. Then an initial estimate is calculated based on the where the user's location would be in this range. If the estimated location is the actual location, the next location will be the starting point (first location), if the estimated location is not the actual location, the last location is recalibrated as the starting point. The process is then repeated to obtain the correct current location of the user.

The multi-user online game or environment may be modified to optimize user/player location, processing only the minimal required information (e.g. status updates) of a user to process and send out to other user devices 302. Similar to the efficiency stated above, search times will be based on processing of the server broadcasted message to obtain pertinent information at the user's current location. Since the user device 302 processes only the current location information of the server broadcast message and the server broadcast message is pre-sorted based on user location, processing the message on the user device 302 is greatly reduced. The user device 302 needs only to scan the server message to obtain the pertinent user location information. Instead of processing all user messages from multiple servers 204, the user device 302 need only process one message compiled of user information from N users and N user messages (M=N). Further, the server 302 and user device 204 may use the current user location information to group player or users in the same vicinity to the same group of servers further reducing server congestion and unnecessary processing. As stated above, the efficiency for user devices 302 processing server messages would be greatly improved, the efficiency may reach (N-fold), since the user device 302 needs only to process pre-sorted server messages with pertinent user status and location information each cycle. Instead of processing potential $N^2$ messages as in the P2P synchronous communication, the user device 302 needs only to process N messages or less based on server grouping of local players or users (N/S), where S is the number of servers. This process would significantly reduce server processing time as the user location is calculate and processed on the user device 302.

As an example, the user device 302 may determine the range of values using a difference of the last location and the first location, $S_{location}=(X_{final}=234, Y_{final}=546)-(X_{intial}=034, Y_{initial}=201)$ to arrive at a range of X distance traveled being within 200 units and range of Y distance traveled being within 345 units. The user device 302 will perform an initial estimate of where the user's location would be in this range by taking the ($S_{location}$/range) x number of starting locations sent in the user message. So if there were 100 messages sent, and the user's location was ¼ of the range, the initial estimate would be 25. The estimated location will be compared to the user's actual location. If the location is wrong, the system will recalibrate using the estimated location as one of the bounds. So continuing the example from above, if the user's location was before the 25th location, the system would calculate a new range with the 25th location being treated like the last location and only 25 messages were sent. If the location was after the 25th location, that the 25th location would be treated as the starting location and only 76 messages being sent. Note, if the location found is the user's location, the next location will be the starting point. The user doesn't need to search to find themselves, their system already has that information.

The processing module 317 of the user device 302 may perform the following processing steps to determine a real-time list of objects to display on the user display 321. The object information comprises of selected objects based on the information overload principle. Namely, the human eye and mind are capable of tracking/tracing approximately 50 objects simultaneously, so acquire and processing substantially more objects would take up more communication bandwidth without adding to the user experience. Therefore, we limit the objects list to around 100 objects displayed simultaneously.

The process module 317 may calculate a minimum visibility index (intensity/distance$^2$) threshold for the objects lists. Once this limit is reached, the server 204 will stop processing or searching the object information message for more objects. Assuming no blocking terrain is built into the game, the processing module 317 of the user device 302 system will search through server message for object information comprising of a list of nearby objects sorted by distance from the user's starting location in the user's current gameplay environment. The user device 302 may then compare the first elements of every server message stream (based upon the starting location) and will take the object with the minimum distance and add it to the list of visible objects. That object list will then have its next search value incremented by 1. The process is repeated until 100 objects are obtained in the user's current gameplay environment.

In the case of blocking terrain with interchangeable servers, the user device 302 may ignore messages from servers 204 that are not visible from the current user positioning location. For example in a racing game, the object location may normally only be visible to adjacent servers (objects immediately in front or behind the current user position). By limiting the object search on server 204 to 100 objects, and by using flexible or interchangeable servers, a significant reduction in search time is obtained by reducing server 204 to user device 302 messaging by several factors. To further minimize searching to improve application or game speed, these processes may be incorporated into the game. The method of object searching and obtaining user/player current location based on player's/user's dimensional axes is further described in FIGS. 6A-6D below.

Figure 4:
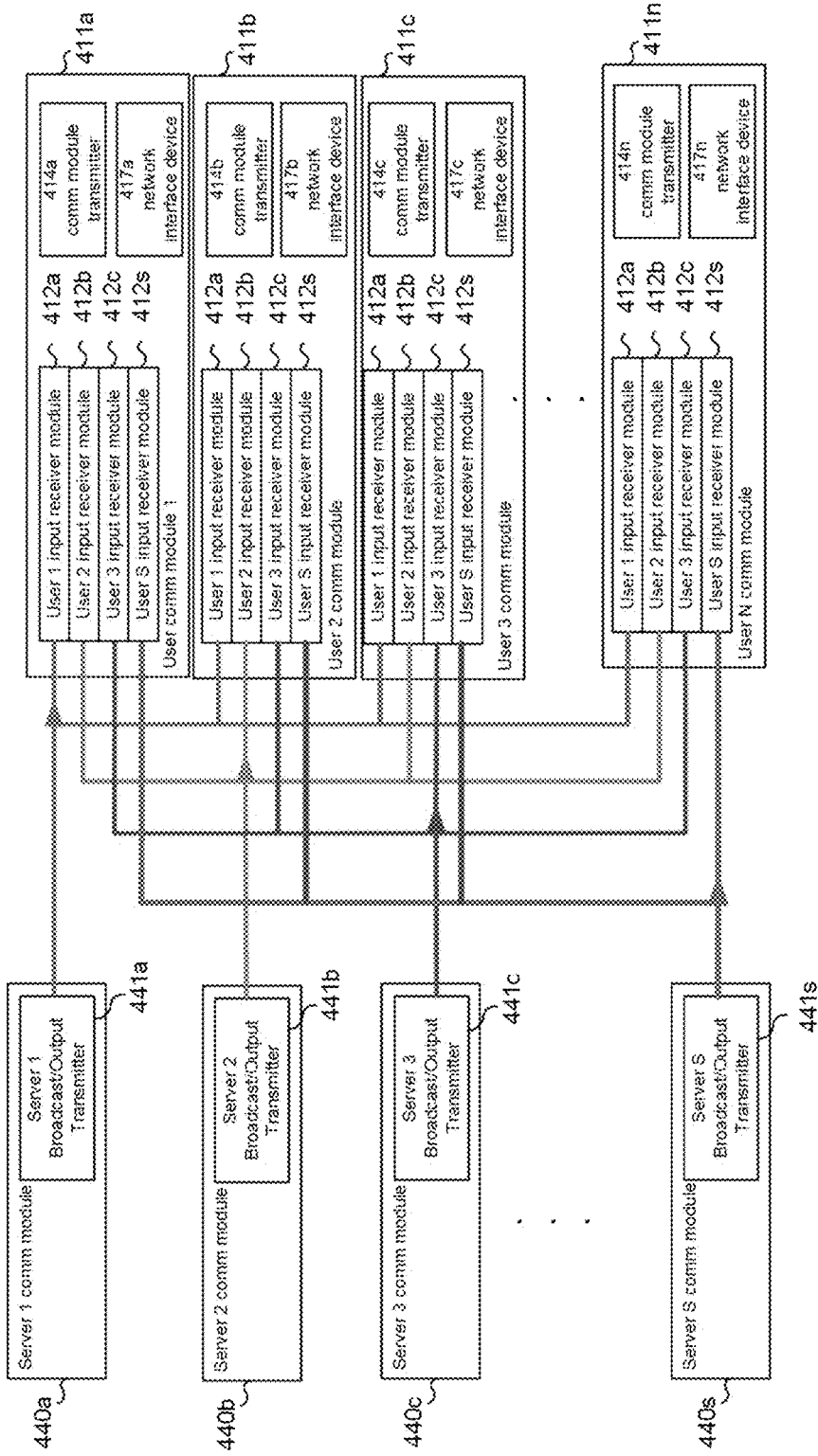
FIG. 4 is an exemplary diagram illustrating an asynchronous communication between the server and user device used in accordance with one or more embodiments of the present disclosure.

FIG. 4 illustrates an exemplary diagram of server 204 to user device 302 asynchronous communication in accordance with some exemplary embodiments of the present disclosure. As shown in FIG. 4, the exemplary server 204 to device communication may be completely asynchronous.

In an online gaming or interactive environment, the server is always sending messages. In synchronous broadcasting systems this poses a great issue as server messages may be ignored or dropped based on a lack of synchronization between the user device and the server on the user location or status in the game or environment. Therefore, the timing of the server and user device messaging must be monitored which causes unnecessary drain on user device and server resources. For example, in Peer to Peer (P2P) messaging system with a 1000 user devices, each user device will receive a message from a server containing all other user actions (999 other user devices), so the P2P servers must process 1000 messages, one from each user device, and send out to 999 users (all other user devices). Therefore, the server must send out 1000×999=999,000 messages per time cycle to relay all user actions in any particular game or environment.

With the present disclosure, the server 204 receives and processes a minimal viable message from each user device 302. That is, each user device 302 provides the minimum status update information for processing by one or more servers 204. The minimal viable message is then compressed at the user device 302 and sent to the server 204. As the server 204 receives messages from all users (user devices 302), the messages are sorted based on user location in the game or environment, compressed, and broadcasted as 1 message to all users (user devices 302). Now, for 1000 user devices 302, the server 204 process minimal status information from each user device 302 and broadcasts 999 messages per time cycle to relay only pertinent user actions in any particular game or environment. The message processing has been primarily done on the user device 302, only pertinent status update information is sent to the server 204, and the message is compressed to reduce congestion on the server 204. The server 204 then sorts the minimal viable message from each user device 302 based on user location in a game or environment, compresses the message, then broadcasts the message back to all user devices 302. The user device 302 receives the sorted message broadcasted from the server 204, searches through the message based on the current user location information, and processes only pertinent information based on the user's current location in an environment or game. The efficiency may reach (N-fold), $N^2/N$, where N is the number of user devices 302.

Referring to FIGS. 2 and 4, each server 204 multiple and preferably independent communication module 440a, 440b, 440c . . . 440s (hereafter "server communication module 440") comprises of one broadcast/output transmitter 441a, 441b, 441c . . . 441s (hereafter "server transmitter 441") that sends (only broadcasts) server messages to each user device 302 and a plurality of server input receiver modules 243.

Each server input receiver module 243 may be assigned to one user device 302 to receive communication from only that one user device 302. That is, the server 204 to user device 302 communication is in one direction, from server 204 to user device 302. Note, every server 204 has only one transmitter 441 and each server transmitter 441 broadcasts a large message to all user devices 302. The server 204 broadcasts a message every cycle, meaning, it will send out the exact same message to every user device 302 as a package of bundled user messages. Thus, each server multiple and preferably independent communication module 440 comprises a plurality of server input receiver modules 243, one transmitter 441 and network interface card 273 for communicating with users 302 and servers 204.

As shown in FIG. 2, each server 204 may include a plurality of input channels (unique server input receivers 243 for each user device 302) and 1 output channel (one transmitter 241 that broadcasts to all user devices 302).

Each user device 302 multiple and preferably independent communication module 411a, 411b, 411c, . . . 411n (hereafter "user multiple and preferably independent communication module 411") comprises of a plurality of user input receiver modules 412a, 412b, 412c, . . . 412n (hereafter "user receiver 412") that receives every server message broadcast from all servers 204 and each user device 302 comprises of one transmitter 414a, 414b, 414c, . . . 414n (hereafter "user transmitter 414"). Thus, each user device multiple and preferably independent communication module 411 comprises a plurality of user receivers 412, one transmitter 414 and network interface card 417 for communicating with servers 204. It is also important to note that each user device 302 has unique receiver 412 for each server 204.

As shown in FIG. 3, each user device 302 may include a plurality of input channels (unique receiver 312 for each server 204) and 1 output channel (one transmitter 314 that broadcasts to all user devices 302).

In addition to asynchronous communication, FIGS. 5A-5B illustrate user device 302 to server 204 allocation using, for example, interchangeable servers or location based servers. FIG. 5A illustrates an exemplary embodiment of interchangeable servers as applied with other aspects of the present disclosure. As shown in FIG. 5A, a plurality of user devices 302-1, 302-2 . . . 302-7 (hereafter "players 1, 2, 3 . . . 7") may be assigned to server 204-1 covering Region 1 or server 204-2 covering Region 2 based on their current location within environment/map 531. The boundary between Region 1 and Region 2 is defined by the servers, for example server 204-1 and 204-2, as border 532 at the initialization of the game/application. As an exemplary embodiment, the game/application starts with players 1, 2, 3 and 5 being assigned to server 204-1 corresponding to Region 1, and players 4, 6 and 7 being assigned to server 204-2 corresponding to Region 2 within environment/map 531. Players 1-7 receive broadcast messages of their current position and other user/player current locations within environment/map 531, and each player receives from the broadcast message a list of object information to display based on current location within Region 1 or Region 2 of the environment/map 531.

As the game progresses, players 1, 2 and 5 enter Region 2 and are assigned to server 204-2, players 4 and 6 enter Region 1 and are assigned to server 204-1, and player 3 remains in Region 1 and stays assigned to server 204-1. The boundary between Region 1 and Region 2 may dynamically shift based on several factors, for example, and not being limited to, server capacity, load or congestion, the number of players within each Region, size of map/environment, user/ player statistics, preferences, habits, or patterns, and server 204 and/or user devices 302 connection speed or location. In doing so, the error rate in determining each player location for each user device 302 within a region is substantially reduced, because each server 204 only needs to process a limited number of input information, for example, Minimal Location Information (MLI) or list of objection information, for each user device 302. Therefore, as shown in FIG. 5B, the new border 535 may be determined by servers 204-1 and 204-2 based on the number of players within Region 1 and Region 2.

Figure 5C:
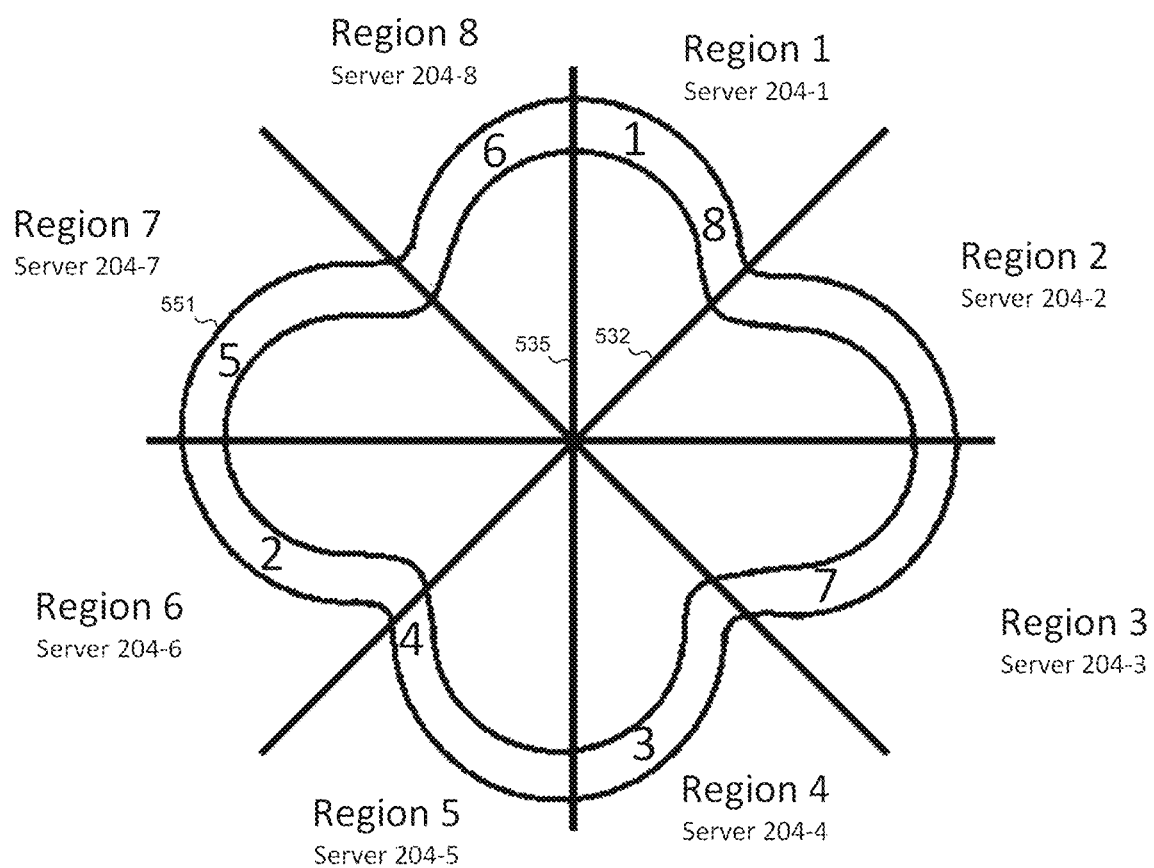

In another exemplary embodiment, the borders of the map/environment may be fixed and users/players may be grouped together in each region. For example, race track 551 shown in FIG. 5C, illustrates users/players 1 and 8 having passed border 535 and being assigned to server 204-1 that processes users/players communications within Region 1. When users/players 1 and 8 progress through race track 551 and traverse adjacent border 532 they are assigned to the adjacent server 204-2 that processes users/players communications within Region 2. Again, based on any of the above factors, for example, user positioning location and/or server load, the user device 302 may receive and/or alternate server connections to facilitate the best server connection possible and the best communication possible based on the hybrid communication model of the present disclosure. As users progress through the multiplayer gaming environment, each server 204 may reallocate user device 302 based on map information, connectivity, and server load.

In another exemplary embodiment, server 204 to user device 302 allocation may be based on server load and/or user device physical location (e.g. location based servers). That is, the user device 302 to server 204 communication is a one to one relationship, each user device 302 will send one message every cycle to one and only one server 204. Each server 204 may allocate a fixed number of user devices 302a, 302b, 302c . . . 302n based on the number of user channels or user receivers 243, for example, server 204a may allocate 10 channels for 10 user devices 302, server 204b may allocate 100 channels for 100 user devices 302, and server 204s may allocate n channels for n user devices 302. The server 204 may receive multiple messages from multiple user devices 302 every cycle, however, each user device 302 will be operate based on their own timing. Therefore, each user will be on their own cycle and will not bear a relationship with any other user in terms of the delivery by the user or the receipt by the server.

It is important to note that there will be very little, if any, sharing of communication lines between the user device 302 and server 204, the server 204 provides a dedicated server input receiver module 243 for each user device 302, that is, a dedicated input port for receiving communication from each user device 302.

For object visibility in the multiplayer online gaming or interactive environment, there are three different models that may be used for determining the number of objects to display for a user based on their positioning location on a map.

The first being, an unsorted object list, where the time to display an object for the user will be {The number of objects in the list}×{Search Constant}.

The second being, a sorted list, where the time to display an object for the user will be {The number of objects selected}×log({The number of objects on the list}).

The third being, the hybrid model of the present disclosure, where the time to display an object will be {The number of objects selected}+{The error factor}. The error factor will be based on the Log({objects in the first list}+{Probability of the Square-Root ({Error-Distance}) of moving the object outside of the error distance}×{The number of objects selected}. It is important to note, in the hybrid model the time to display objects no longer depends on {The number of objects in the list} as a factor, which significantly reduces the time to display objects a user device.

In addition to asynchronous communication and the hybrid communication model of the present disclosure, FIG. 5C illustrates use of an exemplary flexible server zoning or interchangeable server zoning for multi-user online gaming or interactive environments. Any server setup may be used, fixed servers, flexible servers, interchangeable servers, or any combination thereof.

In fixed servers, when a user starts, they have one server they are connected to and they always remain attached to that server. As an example, one benefit of using fixed servers is reduced network infrastructure and complexity, while one drawback may be ineffective searching while in the game and possible server imbalance.

In flexible servers, the user connects to a specific server when their location corresponds to an area owned by that server. As an example, benefits of using flexible servers are, for example, more efficient searching while in game. If there are zone based visibility limitations, this will be the most efficient searching in the game. For example, in FIG. 5C, players in each region or zone 531 (1 to 8) will only need to see users in their server and the next server in a counter clockwise direction. Since, current user location and object visibility is provided as a minimal message of sorted lists of user locations and objects, and searching is done along user's dimensional axes, the addition of zoning in flexible servers will drastically reduce the number of records and users that need to be searched. Since each user in that server will be sorted from start to exit, it will be even more efficient and quicker to identify their fellow gamers whom they can see. With flexible servers, a few drawbacks may exist, for example, increased network infrastructure and possible server imbalances and congestion. Specifically, when a player leaves the zone assigned to their server, they need to communicate their information to a new server. In addition, an excessive number of players may conjugate in the same server reducing that server's effective processing time.

In interchangeable servers, the border moves to the left due to the movement of the 7 users shown, users 1, 2 and 5 will change from the right server to the left server, users 4, 6 and 7 will change from the left server to the right server. User 3 will remain in the right server. As an example, benefits of using interchangeable servers are, for example, more efficient searching while in the game. This will be the most efficient searching in the game where zone based visibility limitations do not exist. One drawback may be increased network infrastructure and server balancing processes probably every cycle (maybe requiring an additional channel)

FIGS. 6A-6D illustrate an exemplary embodiment of calculating object visibility based on user positioning in a map area. In FIG. 6A, the subspace of the user is shown, with user heading 601 and view angle 605, the subspace 603 represents the unviewable are based on the user's heading 601 and viewing angle 605.

In FIG. 6B, the user's starting point 605 and the dimensional axes 621, 623, 625 or 627 are identified and used to determine their starting location 605 and number of objects to display based on their heading 601. The dimensional axes are as follows: the top/down dimensional axis 621, left/right dimensional axis 623, top-left/bottom-right dimensional axis 625, and bottom-left/top-right dimensional axis 627. In this case, since the difference in the Y axis (top/down dimensional axis 621) is less then ½ of the difference in the X axis (left/right dimensional axis 623), our dimensional axis would be the left/right dimensional axis 623.

In FIG. 6C, we determine the user's starting point. The average value of the user's starting point 611 and the median value of the user's starting point 607 are shown. We select a starting point by taking the ratio of the difference between the median 607 and the end of the axis where our starting point 605 is at and use that value to determine where we start searching. Then we take half the distance between the last point, which would initially be the starting point 617, and the old boundary which would be the median 607 in this case for our next point to check. And we keep splitting the distance by half until we find our starting point.

In FIG. 6C, the initial starting point 617, and the old boundary which is median 607 is split in half to give us starting point 613, then the initial starting point 617 is compared with the boundary 613 and split in half to give us starting point 615, then the initial starting point 617 is compared with the boundary 615 and split in half to give us starting point 605. The time this takes is log 2 ({number of objects}/2). It is divided by 2, because we're only searching one side of the median 607. Then we will add every single value in the direction of the axis unless it is not visible, or a different object(s) are really closer or we've reached the number of objects that we're after.

In FIG. 6D, we determine the probability of an error occurring. The error dimension 631 runs at a 90° angle to the dimensional axis 609 of the user's heading 601. The error dimension 631 influences if the object is out of the viewing angle and how much the distance increases. However, the distance increased 633 (by the Pythagorean Theorem) is only increased by roughly ((Distance $633)^2$={Dimensional Axis $609\}^2$+{Error Axis $631\}^2$) the square root of the error dimension 631. And most of those errors will be initially occurring. And since each subspace will only have a limited subset ({Number of Objects}/{Number of Servers}), our errors are greatly limited and are not related to the total number of objects available. Now additional subspace sets included would not need their starting point 605 calculated and would progress according to the dimensional axis 609. However, the further away we get from the starting point 605, the smaller the ratio between the dimensional axis 609 and the error axis 631, so the less errors we will encounter. Object selection errors are reduced by using the dimensional axes to obtain a list of objects to display in the user's interactive environment, and object selection errors are further reduced by negotiating an alternative server for the user device based on users with substantially similar current location information, thereby limiting the total number of objects that need to be evaluated based on the user's dimensional axes.

Reducing Data Transfer Times

In the hybrid model of the present disclosure three factors are disclosed in reducing transfer times: reducing the number of messages, reducing the delays in messages due to waiting for other messages in a queue, and processing the message being received. The third factor of processing the message(s) being received will now be discussed. In processing messages and data for the online gaming environment at the user device, we need to ensure that when the game wants to create a new rendering of the screen for the user, the data for the new rendering is already available at the user device. When the data is available at the user device, there are two choices and requirements for that data: synchronous/coordinated communication or asynchronous/independent communication. The goal is to be as fast as possible, so we choose independent communication transmission, meaning the following must be provided: location of the data to be used, a method of preventing the data being read from being updated while it is being read, and a method to know where to write the new data.

Referring to FIGS. 7A-7F as an exemplary embodiment of writing data in accordance with the hybrid communication model of the present disclosure. On the left column of FIGS. 7A-7F is the status for the incoming data transmissions (IDT) and the column to the right is the status for the ability of the user device (UD) to use that memory for processing. First, we need to setup three blocks of memory, a block being written to, a block being read from, and a block in reserve. There are two sets of three memory addresses, one set for use by the receiver, one set for use by the sub-processor to determine where to read from. The red colored blocks represent an address that is locked, in use, or otherwise not ready (e.g. 1B of FIG. 7B), the yellow colored blocks represent an address that was last used, reserved, or otherwise processing (e.g. 2A of FIG. 7B), and the green colored blocks represent an address that is available for use or otherwise ready.

An exemplary process is shown in FIG. 7A, where memory address Y and X are used for rendering data from server transmitter to user device receiver. The process begins with new data being received by the server in FIG. 7B; on the left column of FIG. 7B is the user device receiver (hereafter "receiver") or messages from the server (A), specifically, the status for the incoming data transmissions (IDT), and the column to the right is the subprocessor status for data for the user device (B), specifically, the status for the ability of the user device (UD) to use that memory for processing.

The receiver will get the top address of block 1A from the receiver's list, and then swap the bottom (block 3B) of the subprocessor list and address of block 1A with each other. Since Block #1 (row 1A/1B) is receiving a new data transmission, the user device needs to be flagged that it won't use Block 1A (subprocessor status/flag block 1B is changed to red, as shown in the diagram). The data is loaded into block 3B, and after the data is fully transmitted, the subprocessor's top block 1B will be swapped with the address of block 1A, and this address of block 1A will be swapped with the address of the block 3B as shown in FIG. 7C. Since the last transmission just finished being received in Block #1, we need to let the user device know it should use Block #1 (so the subprocessor status/flag block 1B is changed to green). In addition, we need to let the subprocessor know not the use the old green status/flag block 1B so we change it from a green status to a different status (which in the case of this diagram is red). We also want to let the transmission stream know not to use Block #1, so we change the receive signal/flag block 1A to red. In addition, we need to let data stream know which block to use, so we change the status/flag block 1A of block 3A to green from red.

In FIG. 7D, the process of rendering the screen is shown. The receiver of the user device is locked, then the data from the server is loaded, evaluated, and processed. We have to lock the data transmission status/flag block 1A to red for the block used (so it won't attempt to update the data we're reading), then the flag block 1A that was red will now need to be upgraded to a new status (green or yellow) depending on what status that the memory block had before. Now since in this example, Block 1A was red before, no swapping needs to occur. If it wasn't red, than swapping would need to occur. In substeps 7.1-7.3 of FIG. 7E, the optimal sequence for the process in FIGS. 7B-7D is shown.

In FIG. 7F, an exemplary process of rendering is shown. In substep 7.4 of FIG. 7F, the server sends a message to the user device (player). The address for the user device is blocked so it cannot read from the location while being written, so address Z is red lighted/moved to the bottom of the address list stack. The message from the server is then loaded starting at address Z until it finishes. FIG. 7F is a more detailed example that also shows how the Data Transmissions are separate from the Screen Renderings, but the dynamics remain the same.

In substep 7.5, once the message finishes loading, the address Z becomes the top of the stack from the user device for reading (green light). The Z address (green light) must be swapped with one of the other address so the next message from the server does not overwrite this message. Since the rendering process is still pulling from address X (red light), then address Y (yellow light) becomes primary/next selected (green light) for a message from the server. The address Z in this example goes to reserve status (yellow light) from messages from the server. In substep 7.6, the process of the server sending a message to the user device of substep 7.4 is mirrored, except it is address Y instead of address Z. In substep 7.7, the process of substep 7.5 is mirror, except the process is as shown in FIG. 7A. The substep 7.8 mirrors substep 7.4. The substep 7.9 mirrors substep 7.5.

In substep 7.10, the second screen rendering starts. Since address Z in this case is the most recent record loaded, it will use the data at address Y. Since address Y is in use, it is locked/red lighted and placed on the bottom of addresses for the server to load messages. Since address X is no longer in use/locked, its value is changed to the value that address Z had which was reserve/yellow light.

Figure 8G:
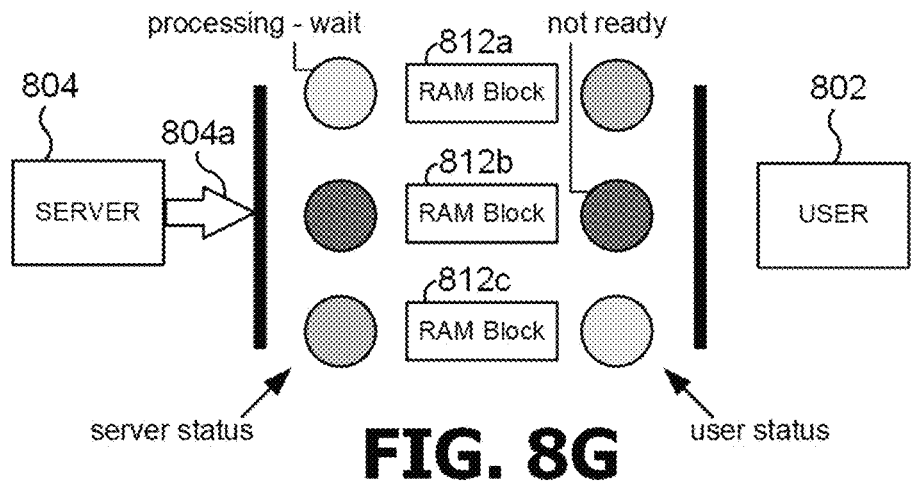

FIGS. 8A-8H illustrate exemplary diagrams of user device receipt of server messages in accordance with some exemplary embodiments of the present disclosure. The process of writing server messages 804a to user device memory begins in FIG. 8A. An exemplary initial state is shown in FIG. 8A, where memory module 244 of user device 802 allocates plurality of RAM (memory) blocks 812a, 812b, 812c ... 812n (hereinafter "RAM block 812") dedicated for storing server data or communications, for example, server messages 804a and running the game or interactive environment on user device 802. In the exemplary initial state of FIG. 8A, the server status is all RAM blocks not in use/ready and user status is all blocks in use/not ready, that is, RAM blocks 812 are empty and ready to be used for storing server messages 804a. In FIG. 8A, data coming from the server 804 to the exemplary three RAM blocks 812a, 812b, 812c has a green light for the server 804, but all of the RAM blocks cannot be used for the user device 802 to get detailed information from the servers.

In FIGS. 8B-8C, an exemplary initial message receipt is shown. In FIG. 8B RAM block 812a of user device 802 receives a first message 814a of server messages 804a. In FIG. 8C, after the memory block 812a is loaded, the server status is changed to block in use/not ready, and user status is changed to block not in use/ready. This reflects that RAM block 812a is not being used to load data from the server 804 and that this RAM block 812a is the one to be used to communicate data to the game on the user device 802.

In FIG. 8D, an exemplary initial message pull is shown for first message 814a. Since this is the first message 814a from the server 804, the server status will be don't use and the user status will be use/pull initial message 814a. In FIGS. 8E-8F, an exemplary normal message pull from the RAM blocks 812 is shown. In FIG. 8E, for RAM block 812a, server status is set to processing/wait for the RAM block 812a to be pulled by user device 802. The server status for the next pull from adjacent RAM block 812b is set to block in use/not ready, and user status is set to next to load/wait. The process is started from beginning in RAM block 812c, server status is set to block not in use/ready to use, and user status is set to block in use/not ready. The process of a normal message pull from the RAM blocks is shown in FIG. 8F.

In FIG. 8F, for RAM block 812a, server status is set to block not in use/ready to use, the server status for the next pull from adjacent RAM block 812b is set to processing/wait for the RAM block 812a to be pulled by user device 802. The user status for RAM block 812a is set to block not in use/ready and the block 812 containing server message 814 is pulled by the user device 802 and the message is read by the user device 802.

Figure 8H:
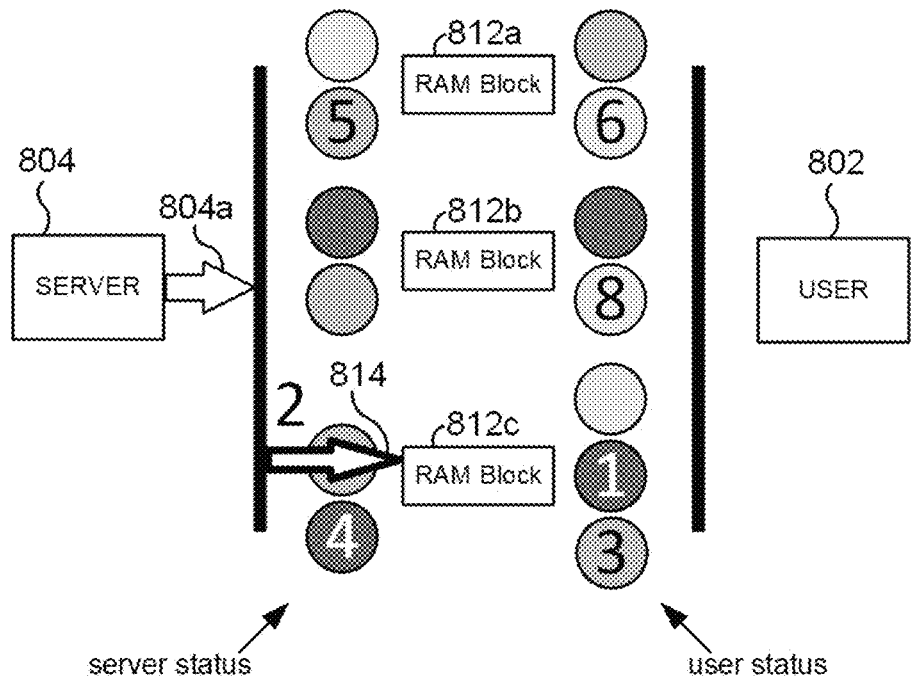

In FIGS. 8G-8H, an exemplary normal message receipt for RAM blocks 812 is shown. Referring to FIGS. 8B-8C for an exemplary initial message receipt, in FIG. 8G, for RAM block 812a, server status is set to processing/wait for the RAM block 812a to be pulled by user device 802. In adjacent RAM block 812b, the server status is set to block in use/not ready, and then the user status is set to block in use/not ready. For the next RAM block 812c, the server status is set to block not in use/ready to use, and then the user status is set to block not in use/ready.

In FIG. 8H, the process of a normal message receipt for RAM blocks 812 is shown. The user status for RAM block 812c is set to block in use/not ready, server status is set to block not in use/ready to use, the server message 814 transferred to RAM block 812c. The user status for RAM block 812c is set to block not in use/ready, the server status is set to block in use/not ready. For RAM block 812a, that is the old server status for a previous message receipt to RAM block 812a is set to block not in use/ready to use and then the user status is set to next to load/wait. The user status for the next available RAM block 812b is set to next to load/wait while the server status is block not in use/ready to use.

The user device hardware may be modified to include dedicated port(s) for receiving broadcast messages from one or more servers in a large scale multi-user online communication environment. Also, the user device hardware may be modified to facilitate rapid generation of minimal viable message of the user status information. The user device hardware may also be modified to facilitate quickly sorting, filtering, and compressing of messages sent and received in a large scale multi-user online communication environment.

The present disclosure pertains to communication means for optimizing information processing between servers and user devices by distributing vast amounts of data for continuous parallel processing. The data may be used for positional based processing or modeling, and may be used in simulations, for example, nuclear, weather, galaxy and star cluster formations, and need not be limited to large scale multi-user online gaming and interactive environments.

Apparently, a person skilled in the art can make various modifications and variations to this application without departing from the spirit and scope of this application. In this way, this application is intended to cover these modifications and variations of this application provided that they fall within the scope of protection defined by the following claims of this application and their equivalent technologies.

It should be noted that this application can be implemented in software and/or a combination of software and hardware, for example, implemented by using an application-specific integrated circuit (ASIC), a general purpose computer, or any other similar hardware device. In an embodiment, a software program in this application can be executed by a processor to implement the steps or the functions described above. Similarly, the software program (including a related data structure) in this application can be stored in a computer-readable recording medium such as a RAM, a magnetic or optical drive, or a floppy disk and a similar device. In addition, some of the steps or the functions in this application may be implemented by hardware, for example, as a circuit that cooperates with a processor to perform various steps or functions.

In addition, a part of this application can be applied as a computer program product, such as a computer program instruction. When the computer program product is executed by a computer, a method and/or technical solutions according to this application can be invoked or provided. The program instruction for invoking the method in this application may be stored in a fixed or removable recording medium, and/or transmitted by a data stream in a broadcast or other signal bearing medium, and/or stored in a working memory of the computer device that runs according to the program instruction. Herein, an embodiment according to this application includes an apparatus. The apparatus includes a memory for storing a computer program instruction and a processor configured to execute the program instruction. When the computer program instruction is executed by the processor, the apparatus is triggered to run the foregoing methods and/or technical solutions according to the plurality of embodiments of this application.

For a person skilled in the art, apparently, this application is not limited to the details of the foregoing exemplary embodiments and this application can be implemented in other specific forms without departing from the spirit or basic characteristics of this application. Therefore, at any point, the embodiments should be considered to be exemplary and non-restrictive, and the scope of this application is limited by the attached claims rather than the foregoing descriptions, and therefore, all changes falling in the meaning and scope of the equivalent of the claims are included in this application. Any reference numeral of the claims should not be considered as a limitation to the involved claim. In addition, apparently, the term "include" does not exclude other units or steps, and singulars do not exclude plurals. A plurality of units or apparatus described in an apparatus claim may also be implemented by a single unit or apparatus through software or hardware. First, second, and other terms are used to represent names, instead of representing any particular order.

What is claimed:

1. A user device, for interactive environment processing and communication, the device comprising:
   one or more communication modules, wherein the one or more communication modules is configured to communicably couple to one or more communication networks;
   wherein the one or more communication modules couple the user device to one or more servers;
   one or more processing modules;
   a memory module comprising instructions stored therein, which, when executed by the one or more processing modules cause the one or more processing modules to perform operations comprising:
      receiving one or more server messages from the one or more servers through the one or more communication networks;
      extracting an information from the one or more server messages;
      storing the extracted information in the memory module for immediate execution by the one or more processing modules,
   wherein each communication module further comprises a plurality of user receivers and one transmitter, wherein each user receiver of the plurality of user receivers communicably couples to one server of the one or more servers, wherein each user receiver receives one or more messages from only the coupled server, and wherein the coupled server communicates asynchronously with coupled user devices,
   wherein each server of the one or more servers comprises at least one server communication module, wherein the server communication module comprises one transmitter for communicating the one or more server messages to a plurality of user devices, wherein each server communicates the same one or more server messages to the plurality of user receivers, and wherein each server and user device sends only one message per cycle.

2. The user device of claim 1, wherein each server comprises of a plurality of server receivers, wherein each server receiver communicably couples to one user device, wherein the server receiver receives one or more messages from only the coupled user device, and wherein each server is never delayed due to network traffic.

3. The user device of claim 2, wherein each user device communicates to each server receiver one or more status messages, wherein the one or more status messages includes user minimal location information moving from a first location to a last location, wherein the user minimal location information comprises a user information; and wherein the user information includes at least one or more user position information in the interactive environment.

4. The user device of claim 3, wherein total communication time between the plurality of user devices and the one or more servers is reduced by allocating each user device to each receiver of the one or more servers, wherein a maximum total communication time is N/S and a minimum total communication time is N/S/C, where N is the number of user devices, S is the number of servers, and C is the number of server receivers that are allocated by one-to-one correspondence to each user device; and wherein communication delays are exponentially reduced compared to server based communication networks and peer to peer communication networks, as the number of communication delays are proportional to the number of user devices per server divided by the number of server receivers for each user device.

5. The user device of claim 1, wherein the one or more server messages are one or more broadcast messages communicated to the plurality of user devices, wherein the one or more server messages includes one or more user details within the interactive environment, and wherein each user detail includes a user identification, a model number, a position, a heading, a velocity or damage.

6. A method, for communicably coupling a user device to an interactive environment, the method comprising:
   communicably coupling at least one user device to one server to receive one or more messages from only the coupled server, wherein the coupled server communicates asynchronously with coupled user devices;

communicating by the coupled server the one or more messages to a plurality of user devices including the at least one user device, wherein each server and user device sends only one message per cycle, and wherein each server is never delayed due to network traffic;

receiving, by the at least one user device, the one or more messages from the coupled server;

extracting, by the at least one user device, an information from the one or more messages;

storing the extracted information for immediate execution by the at least one user device.

7. The method of claim 6, wherein the coupled server further comprises a plurality of server receivers for coupling user devices, allocating each server receiver to communicably couple to, and receive one or more messages, from only a coupled user device.

8. The method of claim 7, wherein total communication time between the at least one user device and the coupled server is reduced by allocating each user device to each receiver of the coupled server, wherein a maximum total communication time is N/S and a minimum total communication time is N/S/C, where N is the number of user devices, S is the number of servers, and C is the number of server receivers that are allocated by one-to-one correspondence to each user device; and wherein communication delays are exponentially reduced compared to server based communication networks and peer to peer communication networks, as the number of communication delays are proportional to the number of user devices per server divided by the number of server receivers for each user device.

9. The method of claim 6, further comprising broadcasting the one or more messages to the plurality of user devices to provide one or more user locations within the interactive environment, and wherein each user location includes a user's first location, the user's last location, and a range of intermediary user locations within the interactive environment.

10. The method of claim 9, further comprising communicating to each server receiver one or more status messages, wherein the one or more status messages includes the user's minimal location information moving from the first location to the last location, and wherein the minimal location information comprises a user information; and wherein the user information includes at least one or more user position information in the interactive environment.

11. A non-transitory machine-readable medium, for communicably coupling a given user device to an interactive environment, comprising instructions stored in the non-transitory machine-readable medium, which, when executed by one or more processing modules cause the one or more processing modules to perform operations comprising:

communicably coupling the given user device to one server to receive one or more messages from only the coupled server, wherein the coupled server communicates the one or more messages asynchronously to a plurality of user devices including the given user device, wherein each server and user device sends only one message per cycle, and wherein each server is never delayed due to network traffic;

receiving the one or more messages from the coupled server;

extracting an information from the one or more messages;

storing the extracted information for immediate execution by the user device.

12. The non-transitory machine-readable medium of claim 11, wherein the coupled server further comprises of a plurality of server receivers for coupling user devices, and wherein each server receiver is allocated to communicably couple to, and receive one or more messages, from only a coupled user device.

13. The non-transitory machine-readable medium of claim 11, wherein the one or more messages are broadcast to the plurality of user devices to provide one or more user locations within the interactive environment, and wherein each user location includes a user's first location, the user's last location, and a range of intermediary user locations within the interactive environment.

14. The non-transitory machine-readable medium of claim 13, further comprising instructions stored therein, which, when executed by the one or more processing modules cause the one or more processing modules to perform operations comprising: communicating one or more status messages to the coupled server, wherein the one or more status messages includes the user's minimal location information moving from the first location to the last location, wherein the minimal location information comprises a user information; and wherein the user information includes at least one or more user position information in the interactive environment.

15. The non-transitory machine-readable medium of claim 14, wherein total communication time between the plurality of user devices and the coupled server is reduced due to allocation of each user device to each receiver of the coupled server, wherein a maximum total communication time is N/S and a minimum total communication time is N/S/C, where N is the number of user devices, S is the number of servers, and C is the number of server receivers that are allocated by one-to-one correspondence to each user device; and wherein communication delays are exponentially reduced compared to server based communication networks and peer to peer communication networks, as the number of communication delays are proportional to the number of user devices per server divided by the number of server receivers for each user device.

16. A given user device, for interactive environment processing and communication, the device comprising:

one or more communication modules, wherein the one or more communication modules is configured to communicably couple to one or more communication networks;

wherein the one or more communication modules further comprises a plurality of user receivers and one transmitter, wherein each user receiver of the plurality of user receivers communicably couples to one server, and wherein each user receiver receives one or more messages from only the coupled server;

one or more processing modules;

a memory module comprising instructions stored in the memory module, which, when executed by the one or more processing modules cause the one or more processing modules to perform operations comprising:

allocating a plurality of memory blocks for each user receiver;

receiving, by each user receiver, one or more messages from each coupled server;

writing message contents received by each user receiver directly to the plurality of memory blocks;

retrieving at least one of one or more user status messages for one or more other user devices from the one or more messages.

17. The given user device of claim 16, wherein the one or more user status messages includes at least one of user minimal location information of moving from a first location to a last location, user status, and object location information in the interactive environment of user devices coupled to a same server; wherein the one or more messages are minimum change data messages that reduce a message creation time, a message transmission time, a player to server delay time, a server processing time, a server time to make object and player location lists, and a server time to transmit object and player location lists.

18. The given user device of claim 17, wherein the one or more messages provided by the coupled server contains a user current location information obtained from the user minimal location information, the object location information, and a user status information of all user devices coupled to the same server in the interactive environment.

19. The given user device of claim 18, wherein the message contents are sorted by the coupled server based on current location of all users thereby reducing search time for user devices in obtaining relevant user current location information in the interactive environment.

20. The user device of claim 19, wherein when a current location of a given user substantially differs from a current user location of other users, the coupled server is configured to negotiate an alternative server for the given user device based on users with substantially similar current location information.

21. The given user device of claim 20, wherein the current location of the given user is obtained by taking the given user's initial starting point and a median value of the given user's initial starting point and dividing by half to obtain a value for a new starting point, and iteratively taking half of a distance between the given user's initial starting point and the new starting point to obtain the current location of the given user.

22. The given user device of claim 20, wherein the object location information comprises of a list of n objects to display in the given user's interactive environment, where n is less than or equal to 50, and wherein the coupled server provides a sorted list of n objects to the given user device, sorted by user location in the interactive environment.

23. The given user device of claim 22, wherein a time to display the n objects in the given user's interactive environment is dependent, in part, on the given user's distance to dimensional axes; wherein object selection errors are reduced by using the dimensional axes to obtain then objects to display in the given user's interactive environment, and object selection errors are further reduced by negotiating the alternative server for the given user device based on the users with the substantially similar current location information.

24. The given user device of claim 23, wherein a search time for obtaining the list of n objects to display is reduced by searching the sorted list of n objects based upon an appropriate dimensional axis of the dimensional axes.

25. The given user device of claim 23, wherein search times are reduced by limiting an object search on the coupled server to n objects, and by using either flexible or interchangeable servers to obtain significant reduction in an object search time.

26. The given user device of claim 23, wherein a number of players in the interactive environment is not limited by the list of n objects to display in the given user's interactive environment or by a number of users with the substantially similar current location information.

27. The given user device of claim 23, wherein object selection errors are further reduced by having minimal sized zones based on the given user's location in the interactive environment.

28. The given user device of claim 20, wherein total communication time is reduced by allocating each user device to each receiver of the server, wherein a maximum total communication time is N/S and a minimum total communication time is N/S/C, where N is the number of user devices, S is the number of servers, and C is the number of server receivers that are allocated by one-to-one correspondence to each user device; and wherein communication delays are exponentially reduced compared to server based communication networks and peer to peer communication networks, as the number of communication delays are proportional to the number of user devices per server divided by the number of server receivers for each user device.

29. The given user device of claim 20, wherein total communication time is faster by at least a factor of $N^3$ when compared with peer to peer total communication time, and faster by at least a factor of $N^2$ when compared to server to client total communication time; wherein the coupled server communicates asynchronously with user devices coupled to the coupled server, and each server and each user device sends only one message per cycle; and wherein each server is never delayed due to network traffic.

* * * * *